(12) United States Patent
Yanagi

(10) Patent No.: US 8,284,919 B2
(45) Date of Patent: *Oct. 9, 2012

(54) NETWORK SYSTEM AND COMMUNICATION DEVICE

(75) Inventor: Satoru Yanagi, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1154 days.

This patent is subject to a terminal disclaimer.

(21) Appl. No.: 12/057,068

(22) Filed: Mar. 27, 2008

(65) Prior Publication Data

US 2008/0240386 A1 Oct. 2, 2008

(30) Foreign Application Priority Data

Mar. 29, 2007 (JP) ................................. 2007-089327

(51) Int. Cl.
*H04M 3/42* (2006.01)
(52) U.S. Cl. .................................. 379/209.01; 370/260
(58) Field of Classification Search .................. 379/209, 379/110.1, 266, 265, 212; 370/110.1, 58.2, 370/60.1, 495; 707/104.1
See application file for complete search history.

(56) References Cited

U.S. PATENT DOCUMENTS

| | | | |
|---|---|---|---|
| 5,884,032 A * | 3/1999 | Bateman et al. | 709/204 |
| 6,014,672 A | 1/2000 | Satoh et al. | |
| 2004/0212824 A1 | 10/2004 | Ohara | |
| 2004/0233898 A1 | 11/2004 | Otsuka et al. | |
| 2005/0198068 A1* | 9/2005 | Mukherjee et al. | 707/104.1 |
| 2006/0077119 A1 | 4/2006 | Zhang et al. | |
| 2008/0082318 A1 | 4/2008 | Kataoka et al. | |
| 2008/0208845 A1 | 8/2008 | Yanagi | |

FOREIGN PATENT DOCUMENTS

| | | |
|---|---|---|
| JP | H10-063685 A | 3/1998 |
| JP | 2001-249933 A | 9/2001 |
| JP | 2005-031906 A | 2/2005 |
| JP | 2005-148199 A | 6/2005 |
| JP | 2005-322165 A | 11/2005 |
| JP | 2006-139399 A | 6/2006 |
| WO | 2006/109770 A1 | 10/2006 |

OTHER PUBLICATIONS

Japan Patent Office, Notification of Reasons for Rejection for Japanese Patent Application No. 2007-089326 (counterpart to above-captioned patent application), mailed Jun. 7, 2011.

(Continued)

*Primary Examiner* — Curtis Kuntz
*Assistant Examiner* — Maria El-Zoobi
(74) *Attorney, Agent, or Firm* — Baker Botts L.L.P.

(57) ABSTRACT

A network system may include a first communication device, a second communication device composed separately from the first communication device and an address database. The first communication device may include a first access device. The first access device may be capable of accessing a network address. The address database may store the network address accessed by the first access device. The second communication device may include a telephone device, an address acquisition device and a second access device. The address acquisition device may acquire the network address from the address database in a case where the telephone device receives an incoming call. The second access device may be capable of accessing the network address acquired by the address acquisition device.

9 Claims, 21 Drawing Sheets

OTHER PUBLICATIONS

Shiro Kubota, "Hop! Step! VoIP! (7) CTI and VoIP", Network Magazine, Jun. 1, 2001, vol. 6, No. 6, pp. 118-121. (Concise explanation of relevance provided in attached Notification of Reasons for Rejection for Patent Application No. JP 2007-089326.).

Japan Patent Office, Notification of Reasons for Rejection for Japanese Patent Application No. 2007-049435 (counterpart to above-captioned patent application), mailed Jun. 7, 2011.

Impress Co. Ltd., DOS/V Power Report, Jun. 1, 1999, vol. 9, No. 6, pp. 35 to 37. (Concise explanation of relevance provided in attached Notification of Reasons for Rejection for Patent Application No. JP 2007-049435.).

Japan Patent Office, Notification of Reasons for Rejection for Japanese Patent Application No. 2007-089327 (counterpart to above-captioned patent application), mailed Jun. 14, 2011.

The Intellectual Property Office of the People'S Republic of China; Notification of First Office Action in Chinese Patent Application No. 200810090733.3 (counterpart to the above-captioned US Patent Application) mailed on Jun. 11, 2010.

US Patent and Trademark Office; Office Action in U.S. Appl. No. 12/038,990 (counterpart to the above-captioned US Patent Application) mailed on Jul. 9, 2010.

European Patent Office, European Search Report for European Patent Application No. 08251144.5 (counterpart to above-captioned patent application), dated Nov. 6, 2008.

United States Patent and Trademark Office, Office Action for U.S. Appl. No. 12/956,880 (counterpart to above-captioned patent application), dated Oct. 12, 2011.

* cited by examiner

| User ID | Phone Number | Node Name |
|---|---|---|
| user_A | 1234 | PC-0001 |
| user_B | 5678 | PC-0002 |
| user_C | 9876 | PC-0003 |

NETWORK SYSTEM AND COMMUNICATION DEVICE

CROSS-REFERENCE TO RELATED APPLICATION

This application claims priority to Japanese Patent Application No. 2007-089327, filed on Mar. 29, 2007 the contents of which are hereby incorporated by reference into the present application.

BACKGROUND OF THE INVENTION

1. Field of the Invention

The present invention relates to technology for accessing a network address.

2. Description of the Related Art

For example, there are a large number of sites on a network such as the Internet or an internal corporate intranet. Each of these sites is assigned a unique network address (hereinafter referred to as an "address"). There are various methods for a user to access an address. For example, a user can use a keyboard to input an address into a communication device, and access the site at that address. In addition, for example, as disclosed in Japanese Patent Application Publication No. 2005-322165, a user can input a keyword into a device, and send that keyword to a search engine. The search engine searches for the addresses of sites on the Internet that include the keyword sent from the device. The search engine sends a search result that includes addresses to the device. In this way, a user can access an address that was acquired as a search result.

BRIEF SUMMARY OF THE INVENTION

An address accessed by a user is often stored in a device as "history". A user can select a desired address from the "history" when the user accesses the address that was accessed once before. The user does not have to input the address by operating a keyboard. With this technology, a user can access the same address from one device. However, the present inventors have studied operability in situations in which an address accessed with one device is to be accessed with another device.

The present teaching provides technology that, in situations in which an address accessed with a device is to be accessed with another device, makes it possible for the other device to access that address without inputting the address. Providing this technology can eliminate the burden on a user of inputting an address.

The present specification teaches a network system. The network system includes a first communication device, a second communication device and an address database. The first communication device includes a first access device capable of accessing a network address. The address database stores the network address accessed by the first access device. The second communication device is composed separately from the first communication device. The second communication device includes a telephone device, an address acquisition device and a second access device. The address acquisition device acquires the network address from the address database in a case where the telephone device receives an incoming call. The second access device is capable of accessing the network address acquired by the address acquisition device.

The user X of the first communication device can access any address from the first communication device. This address is stored in the address database. In a case where the user X wants to send search results to the user Y of the second communication device, the user X calls the second communication device by telephone. In this way, the second communication device can acquire the address accessed by the user X from the address database. The user Y can access the address acquired by the second communication device. The user Y does not need to newly input the address accessed by the first communication device when accessing from the second communication device.

DETAILED DESCRIPTION OF THE INVENTION

Here, some of the features of the technology disclosed in the following embodiment are exemplified.
(Feature 1) The first communication device is a PC including a keyboard.
(Feature 2) The second communication device is a multi function device including at least a printing function and a telephone function. The multi function device does not include a keyboard, but includes a plurality of operation keys (e.g., numeric keys).

(Feature 3) A search result format list storage device is included in the network system, and stores text strings commonly used in the network address of a search result of a search engine. This text string may be different for each search engine. The search result format list storage device is installed, for example, in the first communication device. In this case, by determining whether an accessed network address includes a text string stored in the search result format list storage device, the first communication device can add address identification information to that network address. Note that the search result format list storage device may be installed, for example, in the server or the second communication device.

First Embodiment

Figure 1:
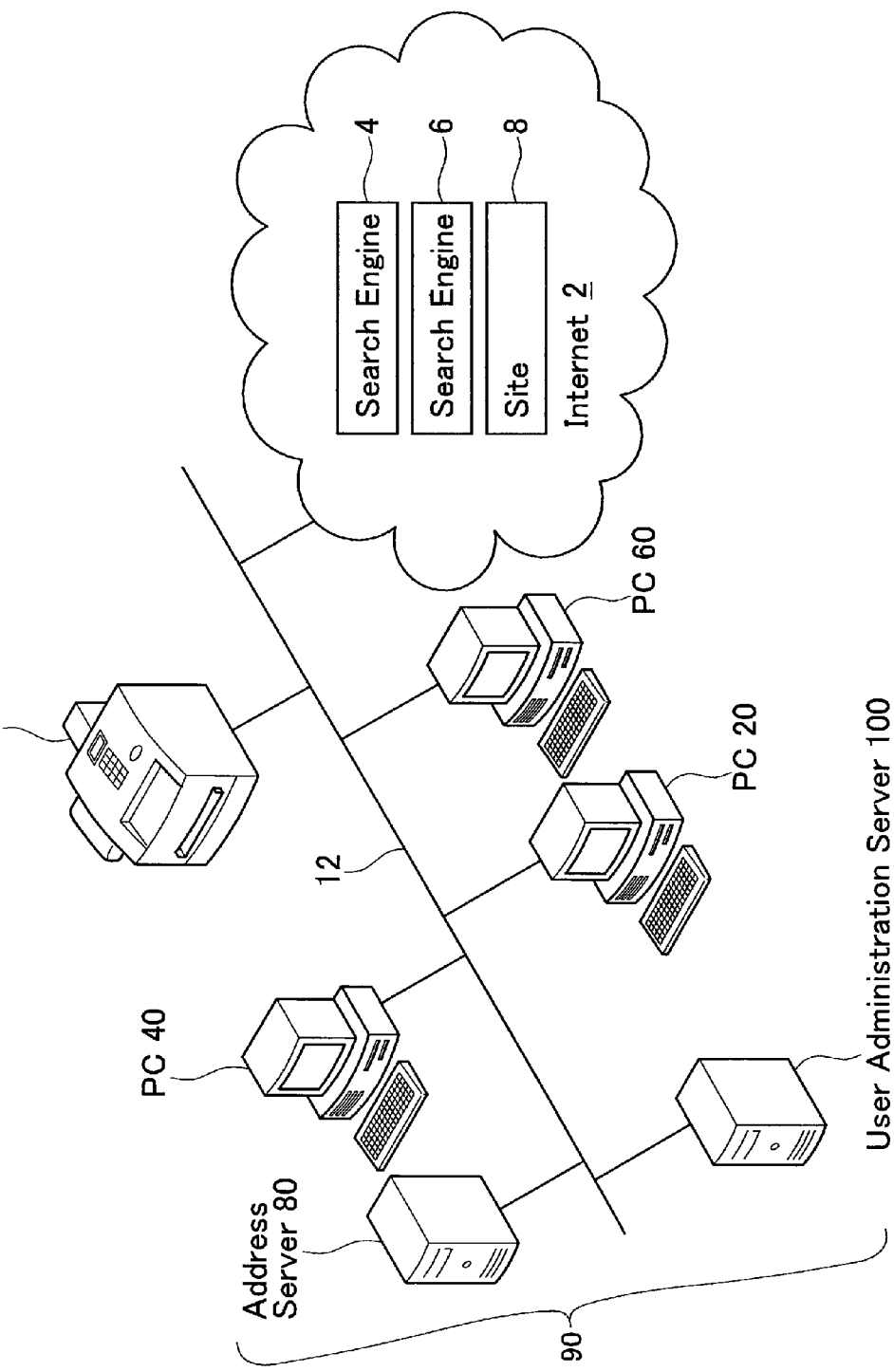
FIG. 1 shows an overall view of a network system of an embodiment.

An embodiment of the present teaching is described with reference to the drawings. FIG. 1 shows in simplified form the construction of a network system 10 of the present embodiment. The network system 10 includes PCs 20, 40, 60, a set of servers 90, a multi function device 120, Internet 2, etc. The set of servers 90 includes an address server 80 and a user administration server 100. The PCs 20, 40, 60, the address server 80, the user administration server 100, and the multi function device 120 are each constructed separately. The PCs 20, 40, 60, the address server 80, the user administration server 100, and the multi-function device 120 are connected to a LAN or WAN via a HUB, router, etc., and are capable of communicating with each other. There is a plurality of search engines 4, 6, etc., having unique addresses on the Internet 2.

(Construction of the PC)

Figure 2:
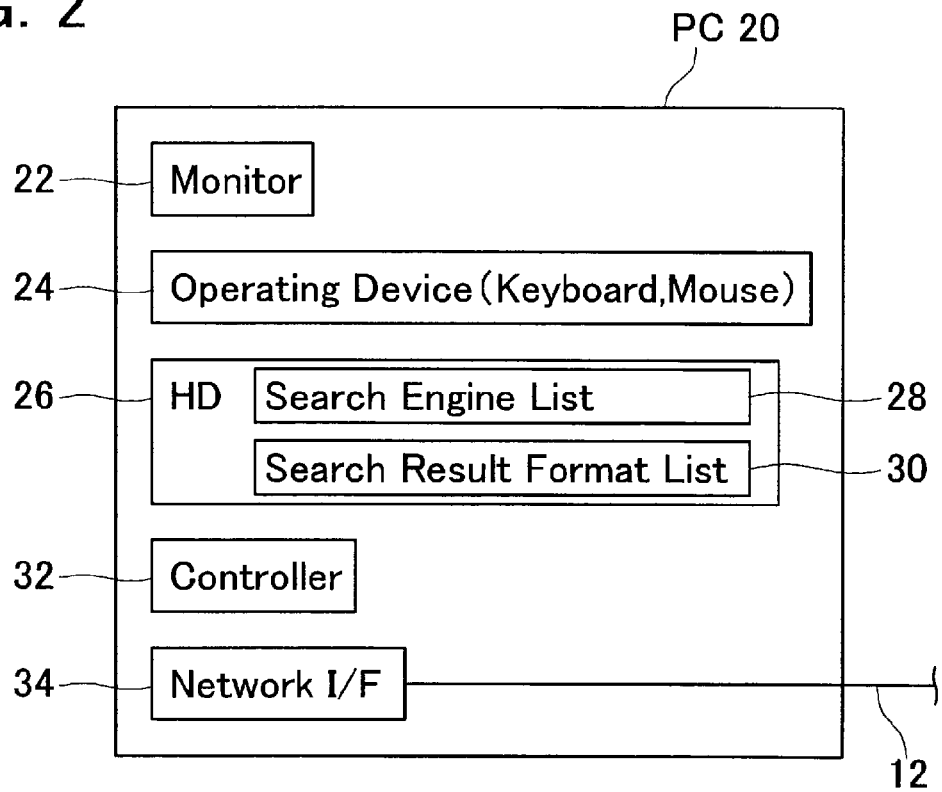
FIG. 2 shows the construction of a PC.

FIG. 2 shows the construction of PC 20. PC 20 includes a monitor 22, an operating device 24, a hard disk (HD) 26, a controller 32, and a network interface (network I/F) 34. The monitor 22 can display various data. The operating device 24 includes a keyboard and a mouse that are operated by a user. A user can input various data and commands into the PC 20 by operating the operating device 24. The HD 26 can store various data. The HD 26 of the present embodiment can store a search engine list 28 and a search result format list 30. The search engine list 28 includes the URLs (Uniform Resource Locator) of the search engines 4, 6, etc. The search result format list 30 can store text strings that are common in URLs that indicate the search results of each search engine. For example, the search engine Google (registered trademark) includes "http://www.google.co.jp/search?" in the URL of a search result. When the keyword "Baseball" is to be searched for on Google (registered trademark), the URL of the search result is "http://www.google.co.jp/search?hl=ja&q=baseball&lr=". The search result format list 30 stores "http://www.google.cojp/search?". The search result format list 30 can likewise store the search results of other search engines. By comparing an accessed URL to the text strings stored in the search result format list 30, the controller 32 can determine whether or not that URL is a URL of a search result. The search engine list 28 and the search result format list 30 are set by a user.

The controller 32 executes various processes in accordance with a preset program, and performs overall control of the operation of the PC 20. The process executed by the controller 32 is described in detail below. A network cable 12 is connected to the network I/F 34. As shown in FIG. 1, the network cable 12 is connected to the Internet 2 via a HUB, router, etc. The PC 20 is capable of executing Internet communications via the network I/F 34. In addition, the network cable 12 is connected to the address server 80 and the user administration server 100 via a HUB, router, etc. The PC 20 is capable of communicating with the address server 80 and the user administration server 100 via the network I/F 34.

The PCs 40 and 60 include the same construction as the PC 20, and thus a detailed description is omitted. The PCs 40 and 60, like the PC 20, is connected with the address server 80 and the user administration server 100 so as to be capable of communication therewith. Note that the number of PCs arranged in the network system 10 of the present embodiment is not limited. In the present embodiment, the PCs are limited to the three PCs 20, 40, and 60 in order to simplify the description.

(Construction of the Address Server)

Figure 3:
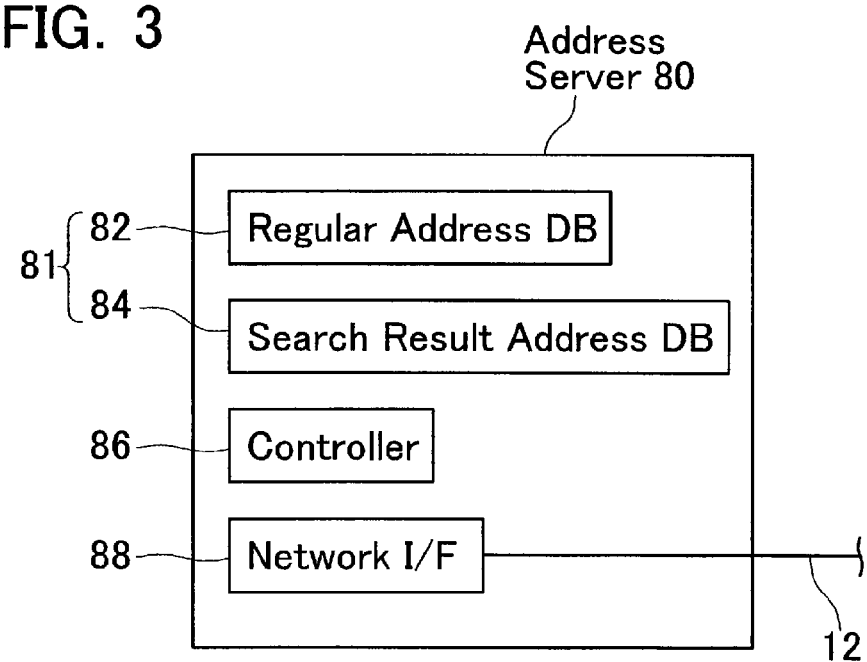
FIG. 3 shows the construction of an address server.
Figure 4:
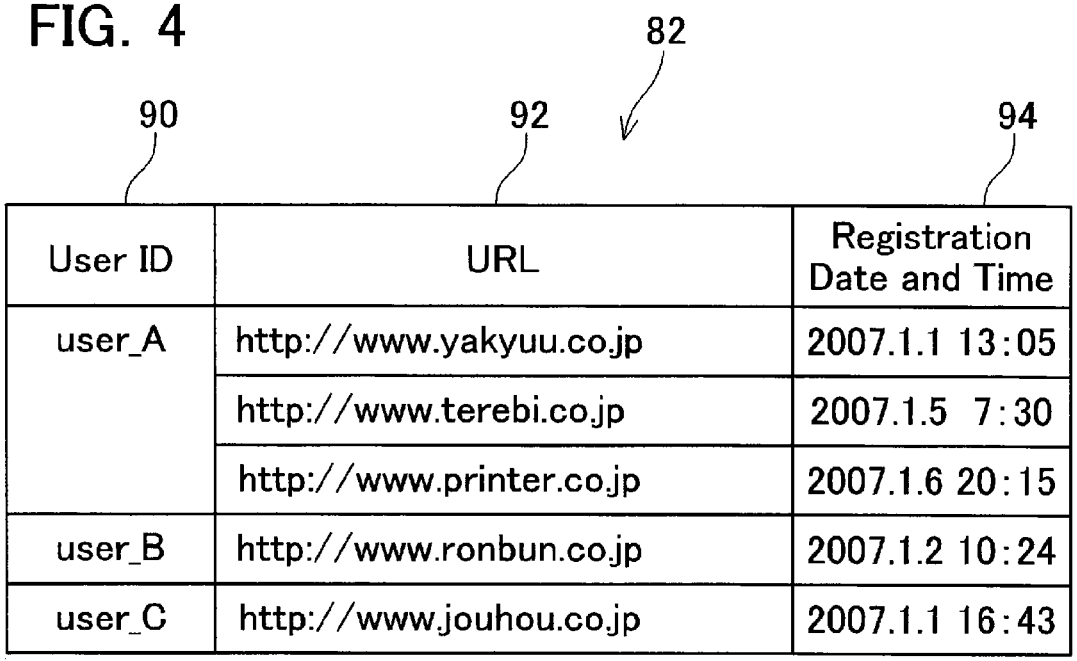
FIG. 4 shows an example of the storage content of a regular address database.
Figure 5:
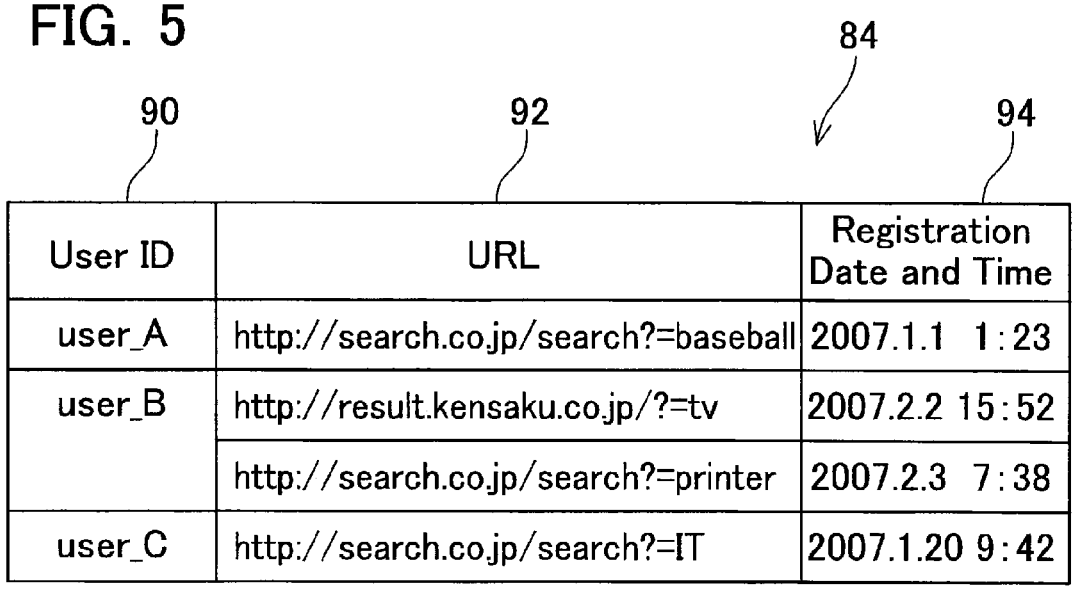
FIG. 5 shows an example of the storage content of a search result address database.

FIG. 3 shows the construction of the address server 80. The address server 80 includes a regular address database (regular address DB) 82, a search result address database (search result address DB) 84, a controller 86, and a network interface (network I/F) 88. FIG. 4 shows an example of the storage content of the regular address DB 82. The regular address DB 82 can store a URL in which the URL identification information (described below) is "regular". The regular address DB 82 can combine and store a user ID 90 described below, and the URL of a site 92. In addition, the regular address DB 82 can store a registration date and time 94 at which the URL 92 was registered. The regular address DB 82 is capable of cumulatively storing a URL and a registration date and time for each user ID. The search result address DB 84 can store a URL in which the URL identification information (described below) is a "search result". As shown in FIG. 5, the search result address DB 84, like the regular address DB 82, can combine and store a user ID, the URL 92 of a site on the network, and the date and time 94 that the URL 92 was registered. The regular address DB 82 and the search result address DB 84 are hereinafter referred to collectively as the address DB 81. A method for storing information in the address DB 81 is described in detail below.

The controller 86 executes various processes in accordance with a preset program, and will perform overall control of the operation of the address server 80. The processes executed by the controller 86 are described in detail below. A network cable 12 is connected to the network I/F 88. As shown in FIG. 1, the network cable 12 is connected to the PC 20 via a HUB, router, etc. The address server 80 can communicate with the PC 20 via the network I/F 88. In addition, the network cable 12 is connected to the multi function device 120 via a HUB, router, etc. The address server 80 can communicate with the multi function device 120 via the network I/F 88.

(Construction of the User Administration Server)

Figures 6, 7:
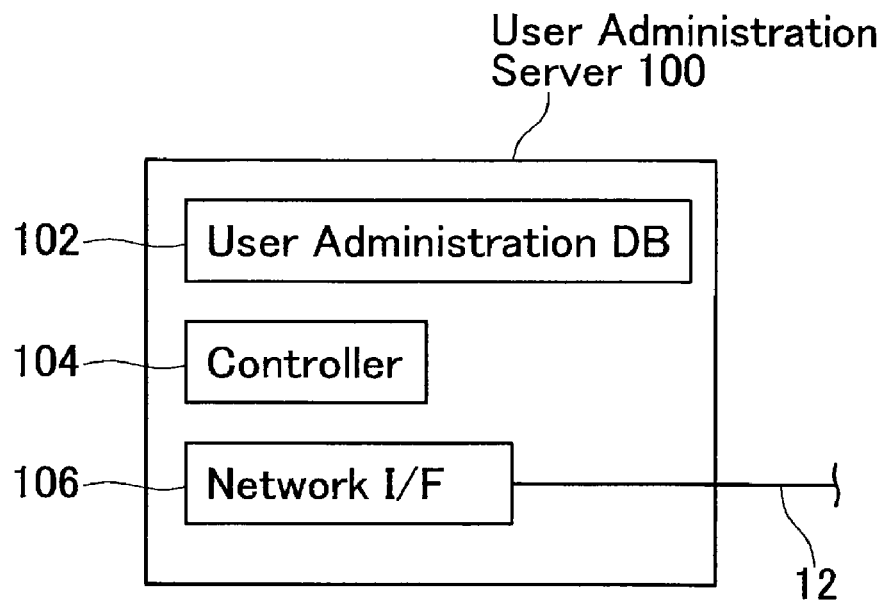
FIG. 6 shows the construction of a user administration server.
FIG. 7 shows an example of the storage content of the user administration database.

FIG. 6 shows the construction of the user administration server 100. The user administration server 100 includes a user administration database (user administration DB) 102, a controller 104, and a network interface (network I/F) 106. FIG. 7 shows an example of the storage content of the user administration DB 102. The user administration DB 102 can combine and store a user ID 110 that identifies a user, a phone number 112 for a telephone (not shown in the drawings) used by that user, and a node name 114 of a PC used by that user. A user ID 110 is assigned to each user that uses a PC on the network system 10. The user IDs and node names of the present embodiment can be changed as needed. The phone number 112 may be a phone number of a portable telephone used by a user, or may be a phone number of a fixed telephone. Alternatively, the phone number 112 may be an internal number inside a company, or may be an IP address of an IP telephone. The controller 104 executes various processes in accordance with a preset program, and performs overall control of the operation of the address server 100. The processes executed by the controller 104 are described later in detail below. A network cable 12 is connected to the network I/F 106. As shown in FIG. 1, the network cable 12 is connected to the PCs 20, 40, and 60 via a HUB, router, etc. The address server 100 can communicate with the PCs 20, 40, and 60 via the network I/F 106. In addition, the network cable 12 is connected to the multi function device 120 via a HUB, router, etc. The address server 100 can communicate with the multi function device 120 via the network I/F 106.

The user administration DB 102 can be changed from each PC on the network system 10. For example, in a case where a new PC is added to the network system 10, that PC is connected to the user administration server 100 via the network cable 12 so as to be capable of communication therewith. A user inputs a user ID, a phone number, and a node name from the operating device of the newly added PC. The user ID, phone number, and node name that were input are sent to the user administration server 100 via the network cable 12. The user administration server 100 receives the sent data via the network I/F 106. The controller 100 of the user administration server 104 stores the received data in the user administration DB 102.

(Construction of the Multi Function Device)

Figure 8:
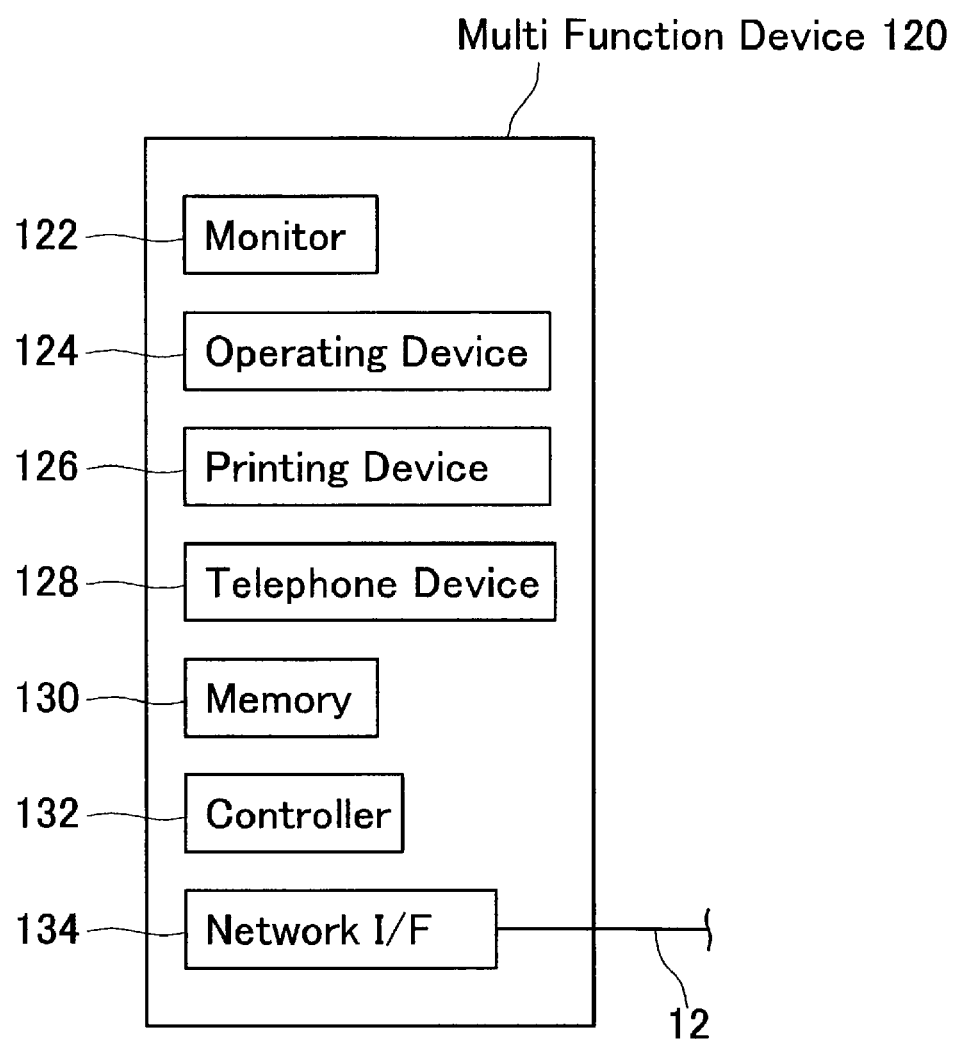
FIG. 8 shows the construction of a multi function device.

FIG. 8 shows the construction of the multi function device 120. The multi function device 120 includes a monitor 122, an operating device 124, a printing device 126, a telephone device 128, a memory 130, a controller 132, and a network interface (network I/F) 134. The monitor 122 can display various data. The operating device 124 includes a plurality of keys (numeric keys, a start key, a cancel key, a search button, etc.) that are operated by a user. The operating device 124 is not constructed from a keyboard and mouse. A user can input various data and commands into the multi function device 120 by operating the operating device 124. The printing device 126 can print onto print media based upon printing data. The printing data may be sent from outside the multi function device 120 (e.g., Internet 2). In addition, the printing data may be produced by a scanner (not shown in the drawings) that forms a portion of the multi function device 120. The telephone device 128 can receive an incoming call from another telephone device (not shown in the drawings) and the phone number of that telephone device. A user can use the telephone device 128 to communicate with a user of another telephone device. The memory 130 can store various data. The content of the information stored in the storage device 130 is described below as needed. The controller 132 executes various processes in accordance with a preset program, and performs overall control of the operation of the multi function device 120. The processes executed by the controller 132 are described in detail below.

A network cable 12 is connected to the network I/F 134. As shown in FIG. 1, the network cable 12 is connected to the address server 80 and the user administration server 100 via a HUB, router, etc. The multi function device 120 is capable of communicating with the address server 80 and the user administration server 100 via the network I/F 134. In addition, the network cable 12 is connected to the Internet 2 via a HUB, router, etc. The multi function device 120 is capable of executing Internet communications via the network interface 134.

(Overview of the Processes for Each Device)

Figure 9:
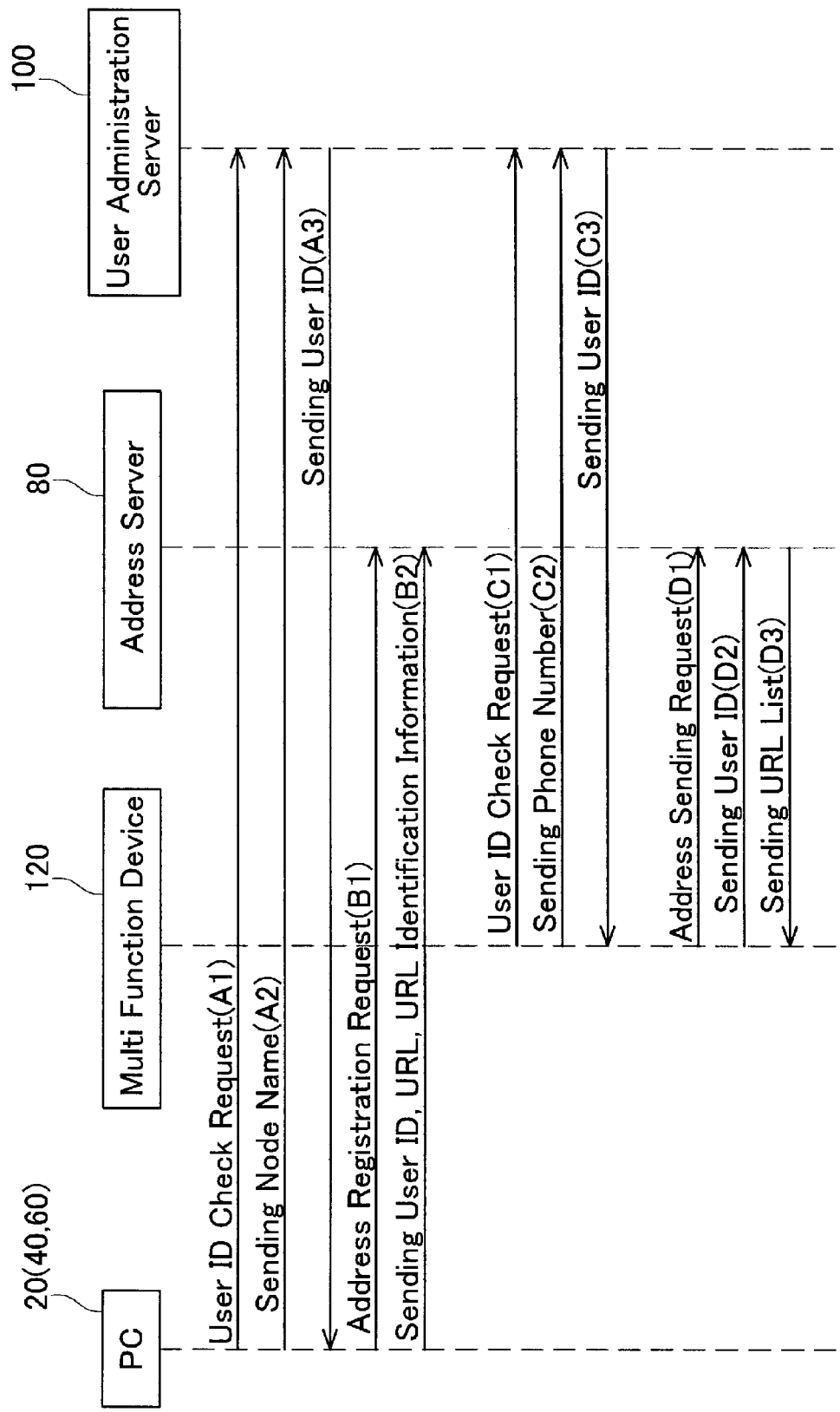
FIG. 9 shows a time chart of the processes executed by each device.

Next, an overview of the processes executed by each of the aforementioned devices 20 (40, 60), 80, 100, and 120 are described. FIG. 9 shows a time chart of the processes executed by each device 20, 80, 100, and 120. The user can select the search engine (e.g., the search engine 4 (see FIG. 1)) by operating the operating device 24 of the PC 20 (see FIG. 2). In addition, the user can input a desired keyword into the PC 20. The PC 20 can execute a search process that sends the keyword input by the user to the selected search engine and acquire a search result. In addition, by operating the operating device 24 of the PC 20, a user can input the URL of a site (e.g., site 8) that a user wants to access, and click the URL displayed on the monitor 22. By operating the operating device 24, the user can request the PC 20 to register the URL of the accessed site, etc. in the address DB 82. For example, the user can cause the registration process to be executed by the controller 32 by clicking the start registration button that is displayed on the monitor 22. The PC 20 sends a user ID check request (A1) to the user administration server 100 when the registration of a URL is requested. The PC 20 sends the user ID check request (A1) at the same time that it sends the node name of the PC 20 to the user administration server 100 (A2). The user administration server 100 sends to the PC 20 the user ID that is combined with the node name sent from the PC 20 and stored in the user administration DB 102 (see FIG. 6) (A3).

Next, the PC 20 sends an address registration request (B1) to the address server 80. Then, the PC 20 sends the user ID sent from the user administration server 100, the URL for which registration was requested, and the URL identification information (described below), to the address server 80 (B2). In this way, the address server 80 can combine a user ID with a URL, and store the same in the address DB 81 (see FIGS. 4, 5).

The telephone device 128 of the multi function device 120 can receive an incoming call signal from another telephone device and the phone number of that telephone device. In a case where the telephone device 128 has received a phone number, the multi function device 120 sends a user ID check request to the user administration server 100 (C1). At the same time the multi function device 120 is sending the user ID check request (C1), the telephone device 128 sends the phone number that was received (C2). The user administration server 100 sends to the multi function device 120 the user ID that is combined with the phone number sent from the multi function device 120 and stored in the user administration DB 102 (C3).

Next, the multi function device 120 sends an address sending request (D1) to the address server 80. Then, the multi function device 120 sends the user ID that was sent from the user administration server 100 to the address server 80 (D2). The address server 80 identifies the URL combined with the user ID sent from the multi function device 120 and stored in the address DB 81. The address server 80 sends a URL list of URL candidate information including the URL and the URL identification information thereof to the multi function device 120 as a URL list (D3). The multi function device 120 can display the URL sent from the address server 80 on the monitor 122 (see FIG. 8). In a case where there is a plurality of URLs that were sent, the user can select one URL from the plurality of URLs that are displayed by operating the operating device 124. In this case, the multi function device 120 can access the URL selected by the user.

(Process of the PC)

Figure 10:
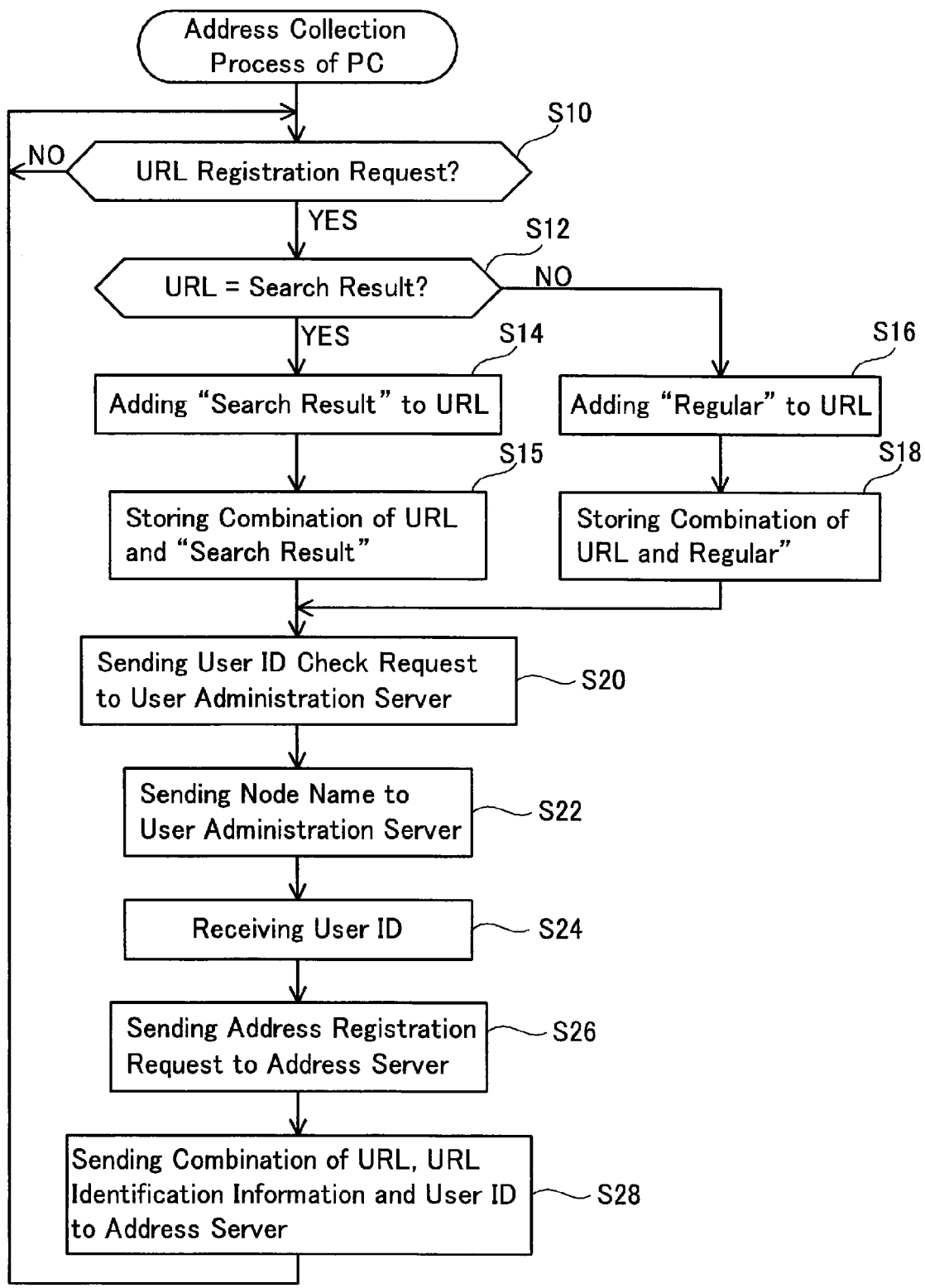
FIG. 10 shows a flowchart of the address collection process of the PC.

Next, the process executed by the PC 20 is described in detail. FIG. 10 shows a flowchart of the URL collection process executed by the PC 20. As noted above, the user can execute the URL registration process with the controller 32 of the PC 20 by clicking the start registration button that is displayed on the monitor 22. The controller 32 monitors whether a URL registration process has been requested (S10). In a case where a URL registration process has been requested, the controller 32 determines whether or not that URL is the URL of the search result that was sent from the search engine (S12). In a case where a part of the accessed URL matches a record stored in the search result format list 30 on the HD 26, the controller 32 determines that that URL is the URL of the search result.

In a case where the answer is YES in S12, the controller 32 adds the "search result" URL identification information to the URL that was determined to be a search result in S12 (S14). Next, the controller 32 sets the URL and the URL identification information as a "search result", temporarily stores the same combination of URL and "search result" on the HD 26 (S15), and then proceeds to S20. In a case where a part of the accessed URL does not match (NO in S12), the controller 32 adds the "regular" URL identification information to the aforementioned other URL (S16). Next, the controller 32 sets the URL and the URL identification information as "regular", temporarily stores the same combination of URL and "regular" on the HD 26 (S15), and then proceeds to S20. Next, in S20, the controller 32 sends a user ID check request to the user administration server 100 (see A1 of FIG. 9). Then, the controller 32 sends the node name of the PC 20 to the user administration server 100 (S22 (see A2 of FIG. 9)). The user administration server 100 sends to the PC 20 the user ID that is combined with the node name of PC 20 and stored in the user administration DB 102 (see A3 of FIG. 9). The controller 32 receives the user ID sent from the user administration server 100 via the network I/F 32 (S24). Next, the controller 32 sends a keyword registration request to the address server 80 (S26 (see B1 of FIG. 9)). Then, the controller 32 sends the URL stored in S15 or S18 and the URL identification information, and the user ID received in S24, to the address server 80 (S28 (see B2 of FIG. 9)). Finally, the keyword collection process is completed.

(Processes of the Address Server)
(Main Process)

Figure 11:
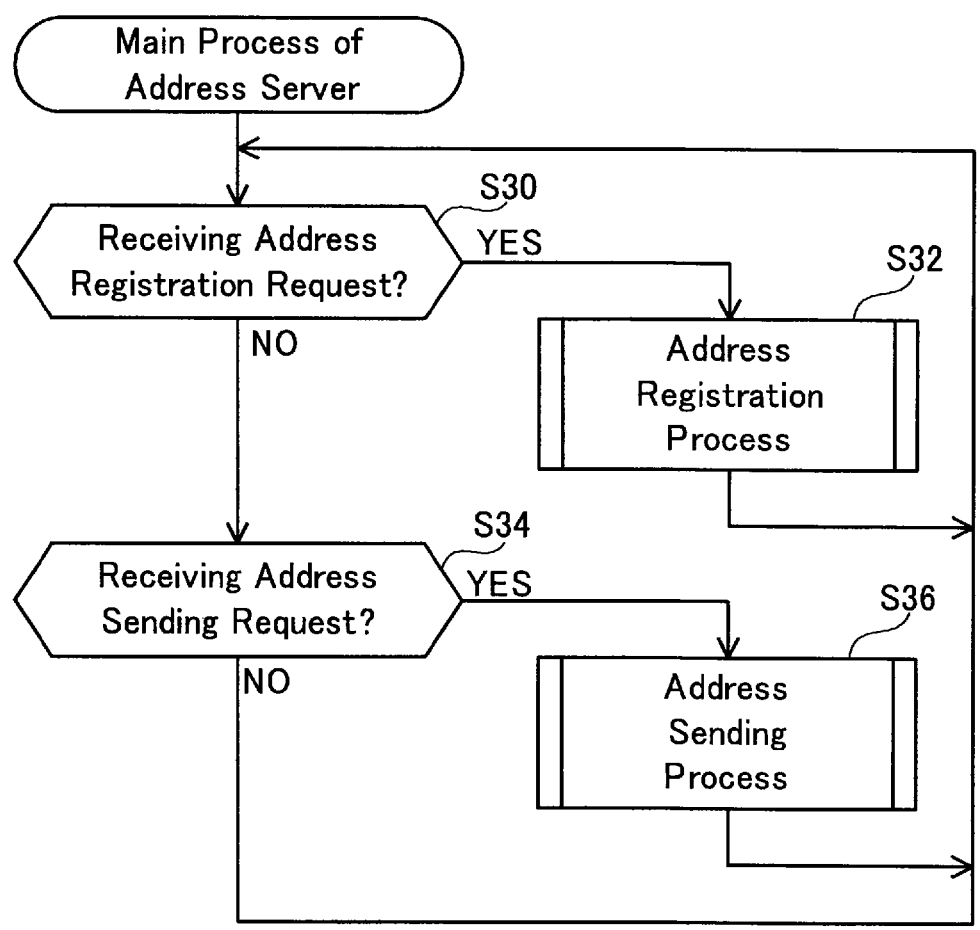
FIG. 11 shows a flowchart of the main process of the address server.

Next, the processes executed by the address server 80 are described in detail. FIG. 11 shows a flowchart of the main process executed by the address server 80. The controller 84 of the address server 80 (see FIG. 3) monitors whether the address registration request sent from the PC 20 (see B1 of FIG. 9, S24 of FIG. 10) has been received (S30). In a case where the address registration request is sent from the PC 20 (YES in S30), the controller 84 executes the address registration process (S32). The address registration process is described in detail below. In addition, the controller 84 monitors whether the address sending request sent from the multi function device 120 (see D1 of FIG. 9, S118 of FIG. 16 described below) has been received (S34). In a case where the address sending request is sent from the multi function device 120 (YES in S34), the controller 84 executes the address sending process (S36). The keyword sending process is described in detail below.

(Address Registration Process)

Figure 12:
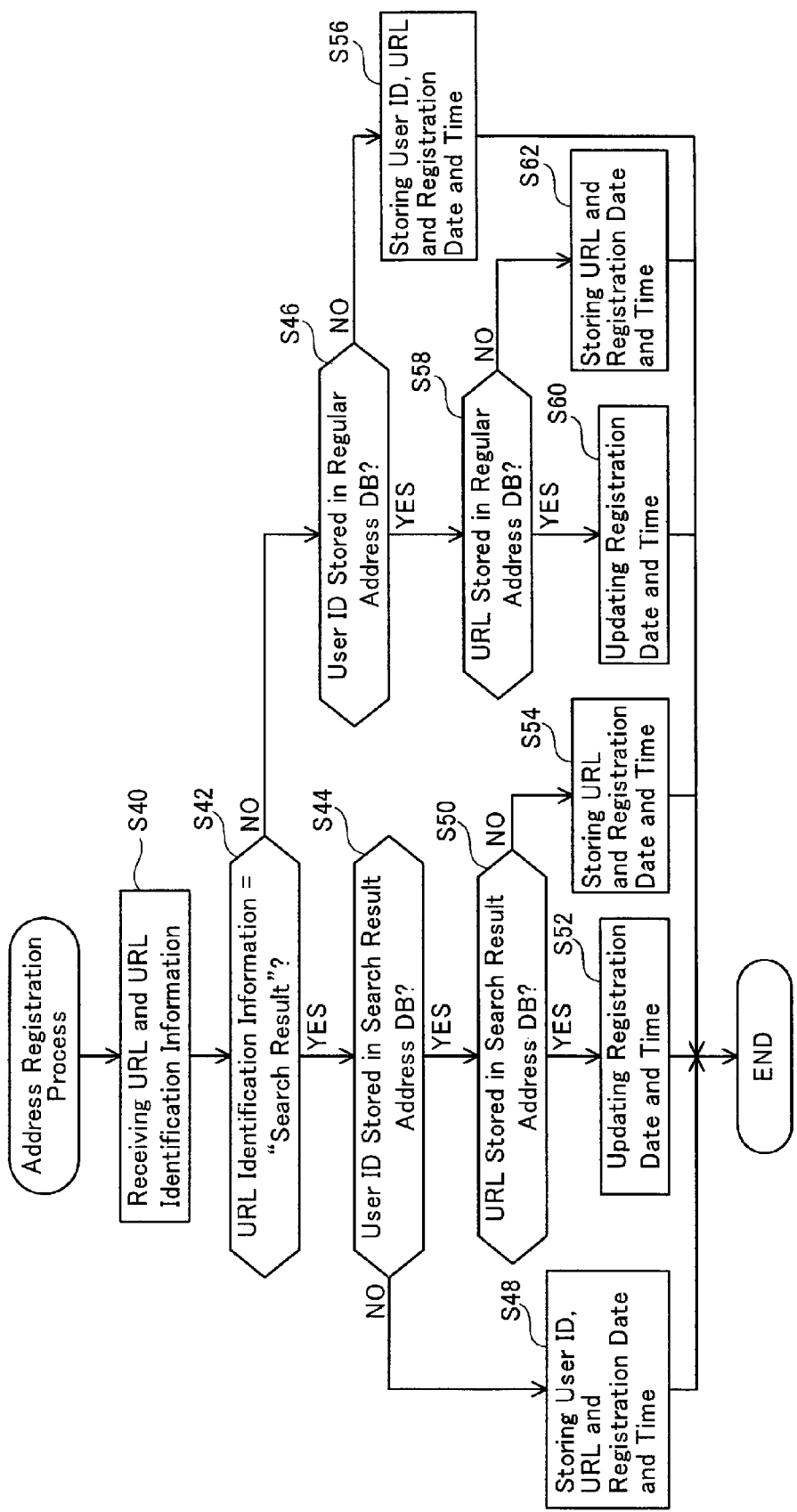
FIG. 12 shows a flowchart of the address registration process of the address server.

FIG. 12 shows a flowchart of the address registration process of S32 of FIG. 11. The controller 84 receives the URL, the URL identification information, and the user ID sent from the PC 20 (see B2 of FIG. 9, S26 of FIG. 10) (S40). The controller 86 confirms whether the URL identification information received in S40 is a "search result" (S42). In a case where the URL identification information is a "search result" (YES in S42), the controller 86 confirms whether the user ID received in S40 is stored in the search result address DB 84 (S44). In a case where the user ID is not stored in the search result address DB 84 (NO in S44), the controller 86 stores the user ID and URL received in S40, and the date and time of registration (S48), in the search result address DB 84, and the address registration process is completed. In contrast, in a case where the user ID is stored in the search result address DB 84 (YES in S44), the controller 86 confirms whether a combination of the URL received in S40 and the user ID received in S40 is stored in the search result address DB 84 (S50). In a case where the combination of the URL and the user ID is stored in the search result address DB 84 (YES in S50), the date and time of registration combined with the previously mentioned combination are updated (S52), and the address registration process is completed. In contrast, in a case where the he combination the URL and the user ID is not stored in the search result address DB 84 (NO in S50), the user ID (received in S40) stored in the search result address DB 84 is combined with the URL received in S40 and stored together with the date and time of registration (S54), and the address registration process is then completed.

In a case where the URL identification information received in S40 is not a "search result" (NO in S42), the controller 86 confirms whether the user ID received in S40 is in the regular address DB 82 (S46). In a case where the user ID received in S40 is not in the regular address DB 82 (NO in S46), the controller 86 stores a combination of the user ID and URL received in S40, and the date and time of registration, in the regular address DB 82 (S56), and the address registration process is completed. However, in a case where the user ID received in S40 is stored in the regular address DB 82 (YES in S46), the controller 86 confirms whether a combination of the URL and the user ID received in S40 is stored in the regular address DB 82 (S58). In a case where the combination of the URL and the user ID received in S40 is stored in the regular address DB 82 (YES in S58), the date and time of registration combined with the previously mentioned combination are updated (S60), and the address registration process is completed. However, in a case where the combination is not stored in the regular address DB 82 (NO in S58), the user ID stored in the regular address DB 82 (the user ID received in S40) is combined with the URL received in S40 and is stored together with the date and time of registration (S62), and the address registration process is completed.

(Address Sending Process)

Figure 13:
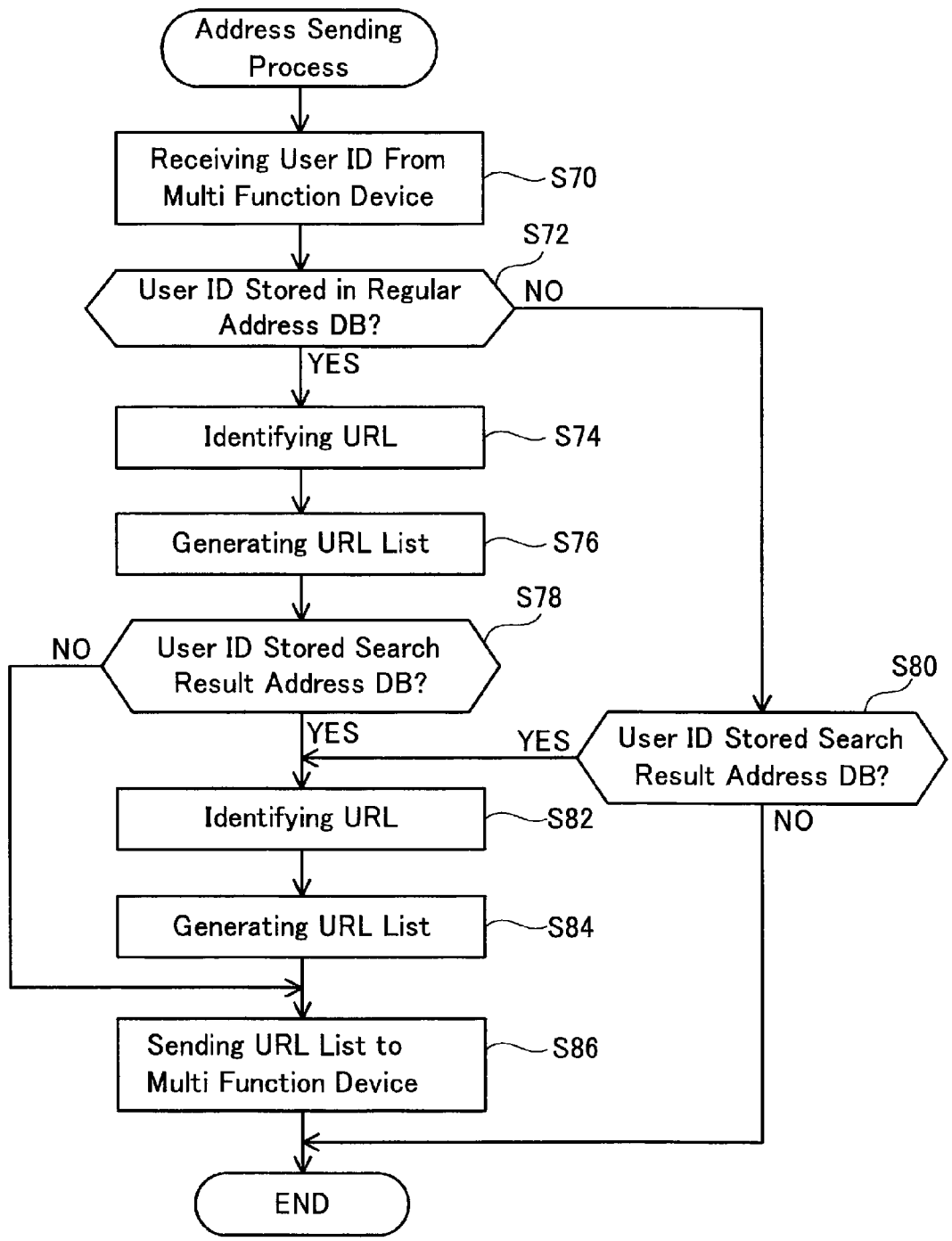
FIG. 13 shows a flowchart of the address sending process of the address server.

FIG. 13 shows a flowchart of the address sending process of S36 of FIG. 11. The controller 86 receives the user ID sent from the multi function device 120 (see D2 of FIG. 9, S130 of FIG. 16 described below) (S70). The controller 86 confirms whether the user ID received in S70 is in the regular address DB 82 (S72). In a case where the user ID received in S70 is not stored in the regular address DB 82 (NO in S72), the controller 86 confirms whether the user ID received in S70 is in the search result address DB 84 (S80). In a case where the user ID received in S70 is not in the search result address DB 84 (NO in S80), the address sending process is complete. In a case where the user ID received in S70 is in the search result address DB 84 (YES in S80), the flow proceeds to S82.

However, in a case where the user ID received in S70 is in the regular address DB 82 (YES in S72), the controller 86 identifies the URL combined with the user ID received in S70 in the regular address DB 82 (S74). Next, the controller 86 generates a URL list including URL candidate information (S76). For example, the controller 86 converts the keywords identified in S74 into a data format that is readable in the multi function device 120. In addition, for example, in a case where the number of URLs identified in S74 exceeds a predetermined number, the controller 86 may confirm the registration date and time of those URLs, and generate candidate information by means of the predetermined number of URLs only. Then, the controller 86 confirms whether the user ID received in S60 is stored in the search result address DB 84 (S78). In a case where the user ID received in S60 is not stored in the search result address DB 84 (NO in S78), the flow proceeds to S86.

However, in a case where the user ID received in S60 is stored in the search result address DB 84 (YES in S78), the flow proceeds to S82. In S82, the controller 86 identifies the URL combined with the user ID sent in S70 and stored in the search result address DB 84. Next, the controller 86 generates a URL list including URL candidate information (S84), and proceeds to S86. In S86, the controller 86 sends the URL list to the multi function device 120 (see D3 of FIG. 9, and S132 of FIG. 16 described below). In this way, the address sending process is completed.

(Process of the User Administration Server)
(User ID Sending Process)

Figure 14:
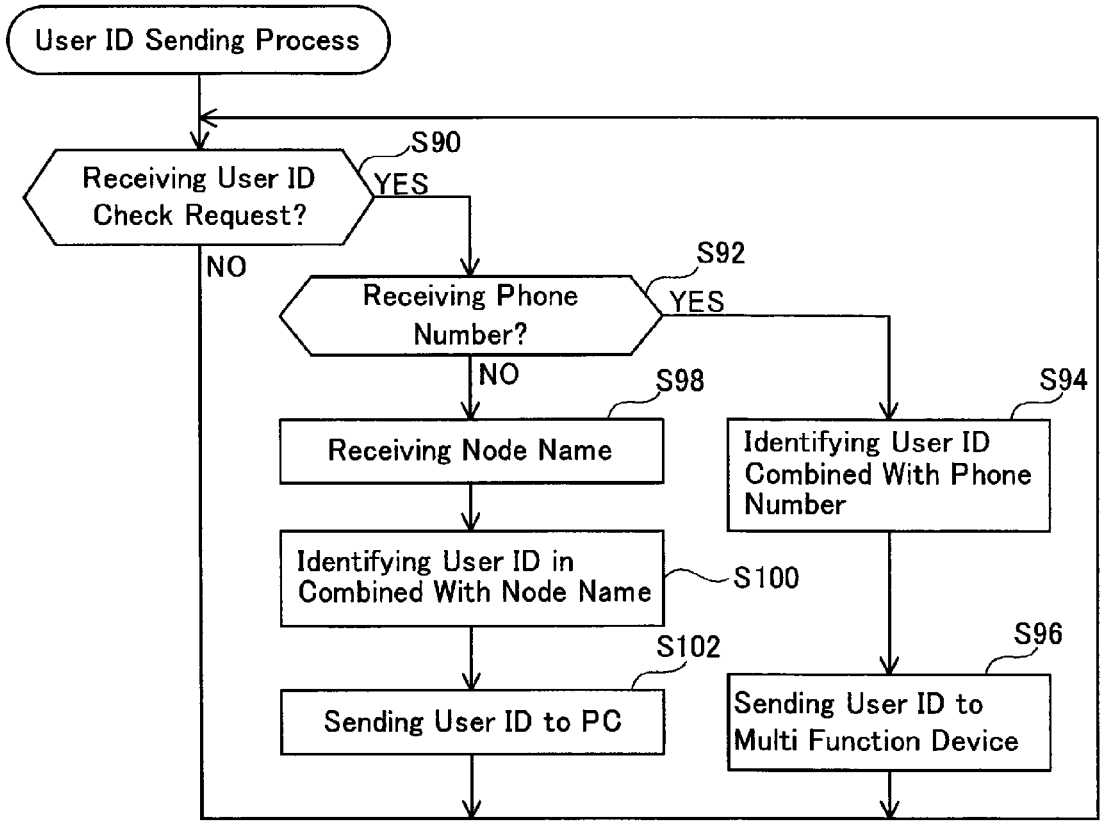
FIG. 14 shows a flowchart of the user ID sending process of the user administration server.

Next, the contents of the user ID sending process executed by the user administration server 100 are described in detail. FIG. 14 shows a flowchart of the process executed by the user administration server 100. The controller 104 of the user administration server 100 (see FIG. 5) monitors whether a user ID check request has been received from the PCs 20, 40, 60 or the multi function device 120 (S90 (see A1 or C1 of FIG. 9, S20 of FIG. 10, and S122 of FIG. 16 described below)). In a case where the controller 104 finds the user ID check request (YES in S90), the controller 104 confirms whether a phone number has been received (S92). In a case where the phone number has been received (YES in S92) (see C2 of FIG. 9, S124 of FIG. 16 described below), the controller 104 identifies the user ID that is combined with the phone number received in S92 and stored in the user administration DB 102 (S94). Next, the controller 104 sends the user ID identified in S94 to the multi function device 120 (S96 (see C3 of FIG. 9, and S126 of FIG. 16 described below)). When S96 is finished, the flow returns to S90, and the controller 104 monitors whether a user ID check request has been received.

On the other hand, in a case where the phone number has not been received (NO in S92), the controller 104 receives the node name of the PC (S98 (see A2 of FIG. 8, S22 of FIG. 10)). Next, the controller 104 identifies the user ID combined with the node name received in S88 and stored in the user administration DB 102 (S100). The user ID identified in S90 is sent to the PC that requested the check (S102 (see A3 of FIG. 8, S24 of FIG. 10)). When S102 is finished, the flow returns to S90, and the controller 104 monitors whether a user ID check request has been received.

(Processes of the Multi Function Device)
(Main Process)

Figure 15:
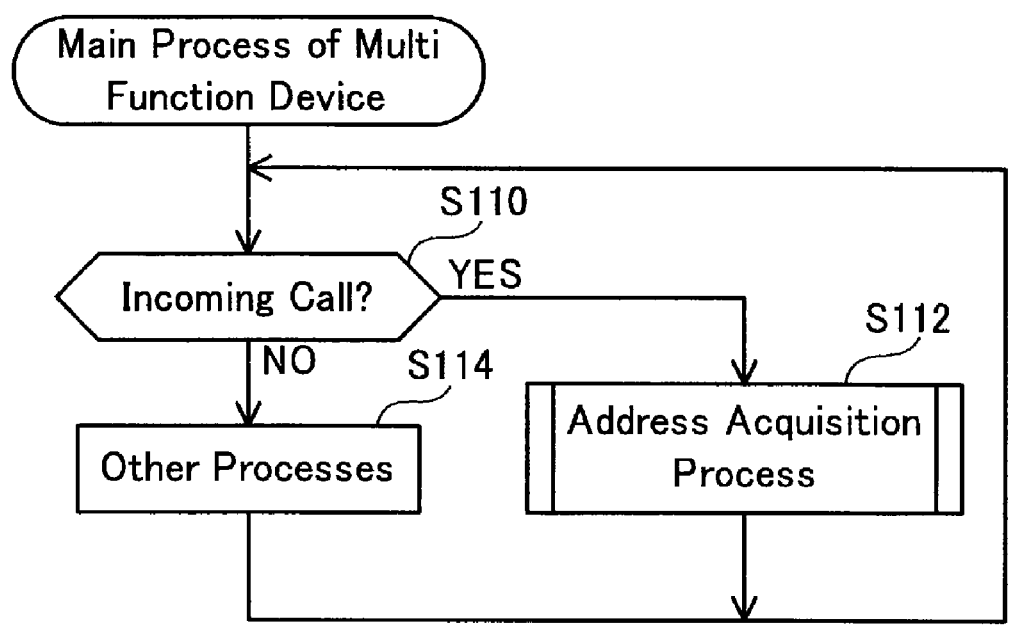
FIG. 15 shows a flowchart of the main process of the multi function device.

Next, the processes executed by the multi function device 120 are described in detail. FIG. 15 shows a flowchart of the main process executed by the multi function device 120. The controller 132 (see FIG. 8) monitors whether the telephone device 128 of the multi function device 120 has received an incoming call (see FIG. 8) (S110). In a case where the telephone device 128 has received the incoming call (YES in S110), the controller 132 executes the address acquisition process (S112). The address acquisition process is described in detail below. However, in a case where a key of the operating device 120 (see FIG. 8) of the multi function device 124 has been operated, the controller 132 determines the answer is NO in S110. In this case, the controller 132 executes other processes in response to the type of key that was operated (S114).

(Address Acquisition Process)

Figure 16:
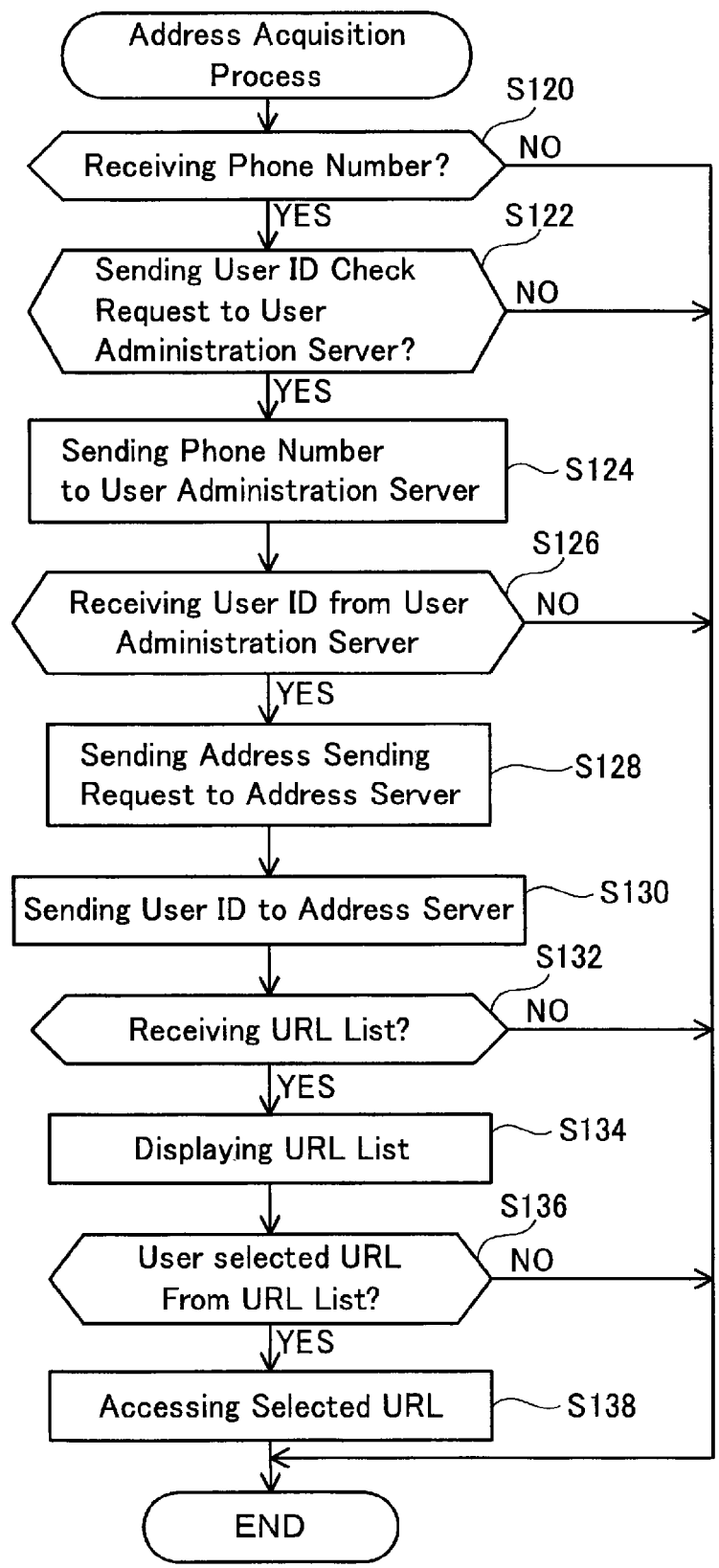
FIG. 16 shows a flowchart of an address acquisition process of the multi function device.

FIG. 16 shows a flowchart of the address acquisition process of S112 of FIG. 15. If an incoming call has been received in the telephone device 128 in S110, the controller 132 monitors whether the telephone device 128 has received the phone number of a source (S120). In a case where the telephone device 128 has not received the phone number of a source (NO in S120) the address acquisition process is completed. However, in a case where the telephone device 128 has received the phone number of a source (YES in S120), the controller 132 sends a user ID check request to the user administration server 100 (S122 (see C1 of FIG. 9)). Next, the controller 132 sends the phone number received in S110 to the user administration server 100 (S124 (see C2 of FIG. 9)). When the process of S124 is complete, the controller 132 monitors whether a user ID has been received from the user administration server 100 within a predetermined period of time (S126). In a case where the user ID has not been received (NO in S126), the address acquisition process is completed. Or, the controller 132 may execute the processes from S122 to S126 a predetermined number of times, and in the event that the answer is NO in S126, the address acquisition process is completed.

However, in a case where the user ID has been received (YES in S126 (see C3 of FIG. 9)), the controller 132 sends an address sending request to the address server 80 (S128 (see D1 of FIG. 9)). Next, the controller 132 sends the user ID received in S116 to the address server (S130 (see D2 of FIG. 9)). When the process of S130 is complete, the controller 132 monitors whether a URL list has been received from the address server 80 within a predetermined period of time (S132). In a case where the URL list has not been received from the address server 80 (NO in S132), the controller 132 completes the address acquisition process. Or, the controller 132 executes the process from S128 to S132 a predetermined number of times, and in the event that the answer is NO in S132, the address acquisition process may be completed.

Figure 17:
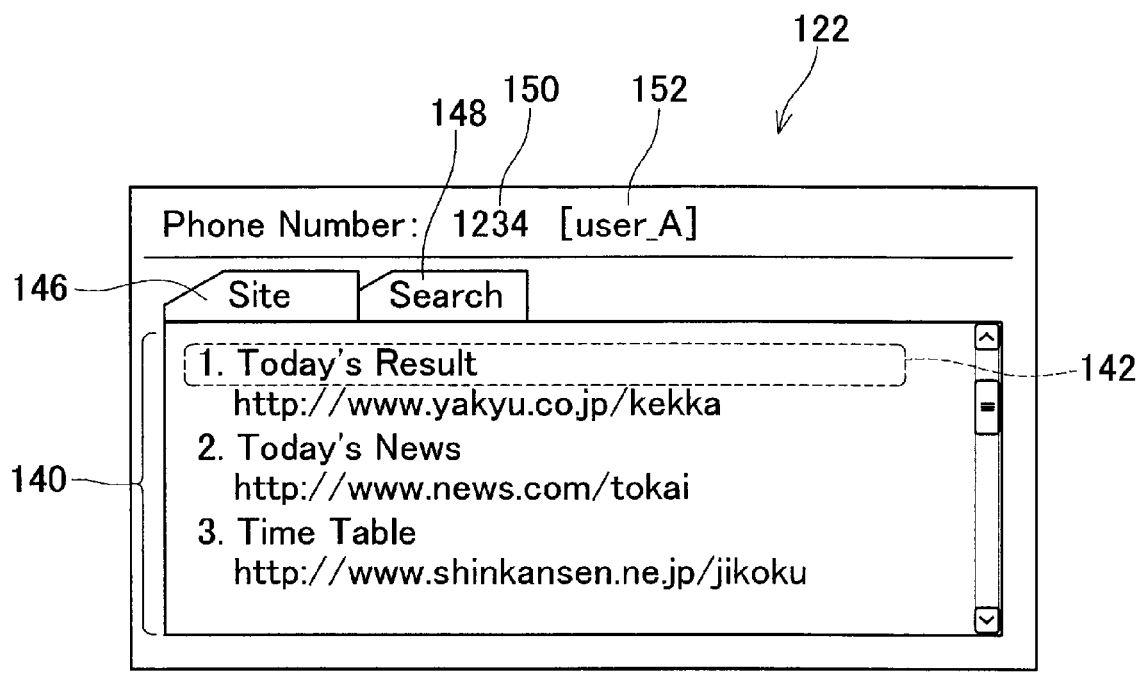
FIG. 17 shows an example of a display device of the multi function device for selecting a URL of a site.
Figure 18:
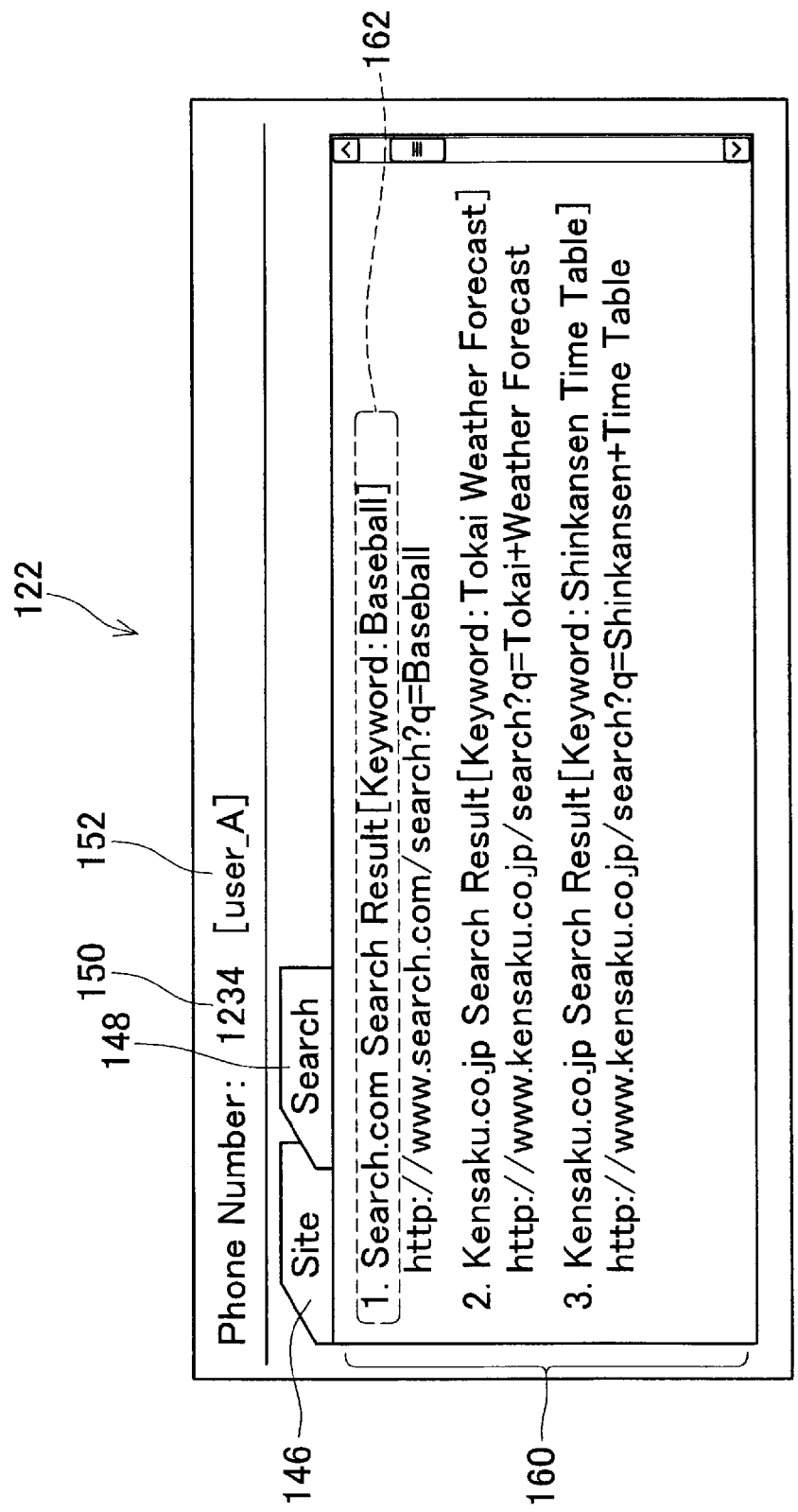
FIG. 18 shows an example of the display device of the multi function device for selecting a URL of a search result.

However, in a case where the URL list has been received from the address server 80 (YES in S132 (see D3 of FIG. 9)), the controller 132 displays on the monitor 122 the URL candidate data received in S132 for specific URL identification information (S134). FIG. 17 shows an example in which the URL identification information is the "regular" candidate data 140 when an incoming call was received from phone number 1234. The monitor 122 can display the phone number 150 and the user ID 152. A user can move the cursor 142 up and down by operating the operating device 124. FIG. 18 shows an example in which the URL identification information is the "search result" candidate data 160 when an incoming call was received from phone number 1234. Although omitted in the flowchart, the controller 132 can identify a keyword included in a URL of a search result from that URL. The candidate information 160 can have an identified keyword. In addition, a user can select tabs 146 or 148 by operating the operation device 124. When the tab 146 is selected, the controller 132 displays the screen illustrated in FIG. 17 on the monitor 122. When the tab 148 is selected, however, the controller 132 displays the screen illustrated in FIG. 18 on the monitor 122.

The controller 132 monitors whether the user has operated the operating device 124 to select one URL (S136). In a case where the user has not selected one URL (NO in S136), the address acquisition process is completed. In contrast, in a case where the user has selected one URL (YES in S136), the controller 132 accesses the selected URL (S138). In this way, the address acquisition process is completed.

The network system 10 of the first embodiment has been described in detail. In this system 10, the URLs accessed with PCs 20, 40, and 60 are accumulated in the address server 80. When a user calls the multi function device 120, URLs are identified by the address server 80 based upon the phone number. The multi function device 120 can access the URL identified by the address server 80. For example, assume a user X learned of information on a site with PC 20 and wants to inform a user Y of the multi function device 120 of that information. The user X calls the multi function device 120 from a telephone having a phone number stored in the user administration server 100. When the user Y receives the telephone call, the URL is identified with the multi function device 120. With this system 10, there is no need for the user Y to input a URL.

In addition, because there is no need to input a keyword, the user Y can easily access a site from the multi function device 120 while speaking to user X by telephone. In addition, in a case where user X communicates a URL by telephone to user Y, errors may occur such as misspeaking or mishearing. With this system 10, these errors are reduced because the URL is identified without being input by user Y.

In this system 10, there is a one to one relationship between the URL stored in the address DB 81 and the phone number received with the multi function device 120. Because of that, even when a large number of URLs are stored in the address DB 81, the address server 80 can identify only the URL that is combined with the received phone number. Because of that, the URL acquired by the multi function device 120 can be restricted. A user can omit the task of searching for a URL. In addition, because the URL of a search result is distinguished from another type of URL, it can be easy for a user to search for a URL.

In this system 10, the node name of the PC can be combined with the phone number of the user X, and stored in the user administration DB 102 of the user administration server 100 in advance. An address P executed by a search process in the PC 20 is combined with the node name of the PC 20 and stored in the address DB 81 of the address server 80. In a case where there is an incoming call to the multi function device 120, and the phone number of a source is the phone number of the user X, the node name of the PC 20 is identified from the user administration DB 102. The address P that is combined with the identified node name and stored in the address DB 81 is acquired by the multi function device 120. However, in a case where there is an incoming call to the multi function device 120, and the phone number of a source is not the phone number of the user X, the node name of the PC 20 is not identified from the user administration DB 102. The result is that the aforementioned address P is not acquired by the multi function device. In other words, the multi function device 120 does not acquire an address in response to all incoming calls, but acquires an address only when the incoming call is from a telephone device including phone number that is pre-registered in the user administration DB 102.

For example, the aforementioned system is particularly effective when there is a plurality of the PCs. For example, assume that there are two PCs, and the node names for these are M1 and M2. In addition, assume that the user of one PC is X1, and the user of the other PC is X2. In this case, the user administration DB 102 of the user administration server 100 can store a combination of the phone number of the user X1 and M1, and a combination of the phone number of the user X2 and M2. The address DB 81 of the address server 80 stores the combination of the address P1 and M1, and the combination of the address P2 and M2. For example, when there is an incoming call to the multi function device 120, and the phone number of a source is the phone number of the user X1, M1 is identified from the user administration DB 102, and the address P1 combined with M1 is acquired by the multi function device 120. For example, when there is an incoming call to the multi function device 120, and the phone number of a source is the phone number of the user X2, M2 is identified from the user administration DB 102, and the address P2 combined with M2 is acquired by the multi function device 120.

In this system, one of the plurality of PCs can be identified based upon the phone number of the incoming call to the multi function device 120. The multi function device 120 can acquire the address that was accessed with the identified PC.

Second Embodiment

Next, a second embodiment of the present teaching is described. Here, the differences between the first and second embodiments are described.

(Construction of the User Administration Server)

Figure 19:
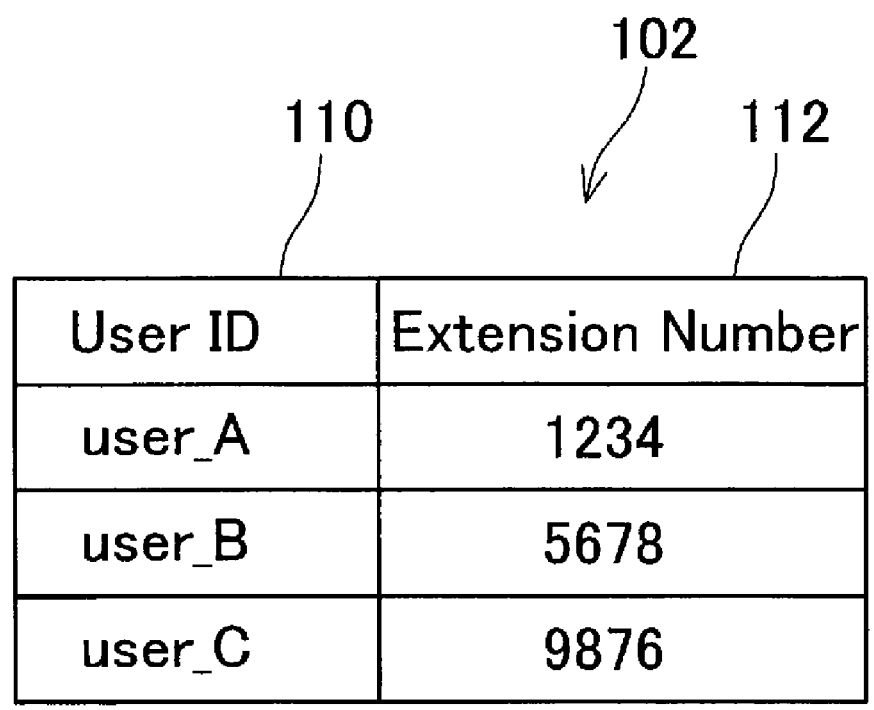
FIG. 19 shows an example of the storage content of the user administration database (second embodiment).

The construction of the user administration DB 102 is different in the second embodiment. FIG. 19 shows an example of the storage content of the user administration DB 102. The user administration DB 102 can combine and store a user ID 110 that identifies a user with a phone number 112 of the user telephone (not shown in the drawings). The user administration DB 102 does not store the node names of PCs.

(Overview of the Processes for Each Device)

Figure 20:
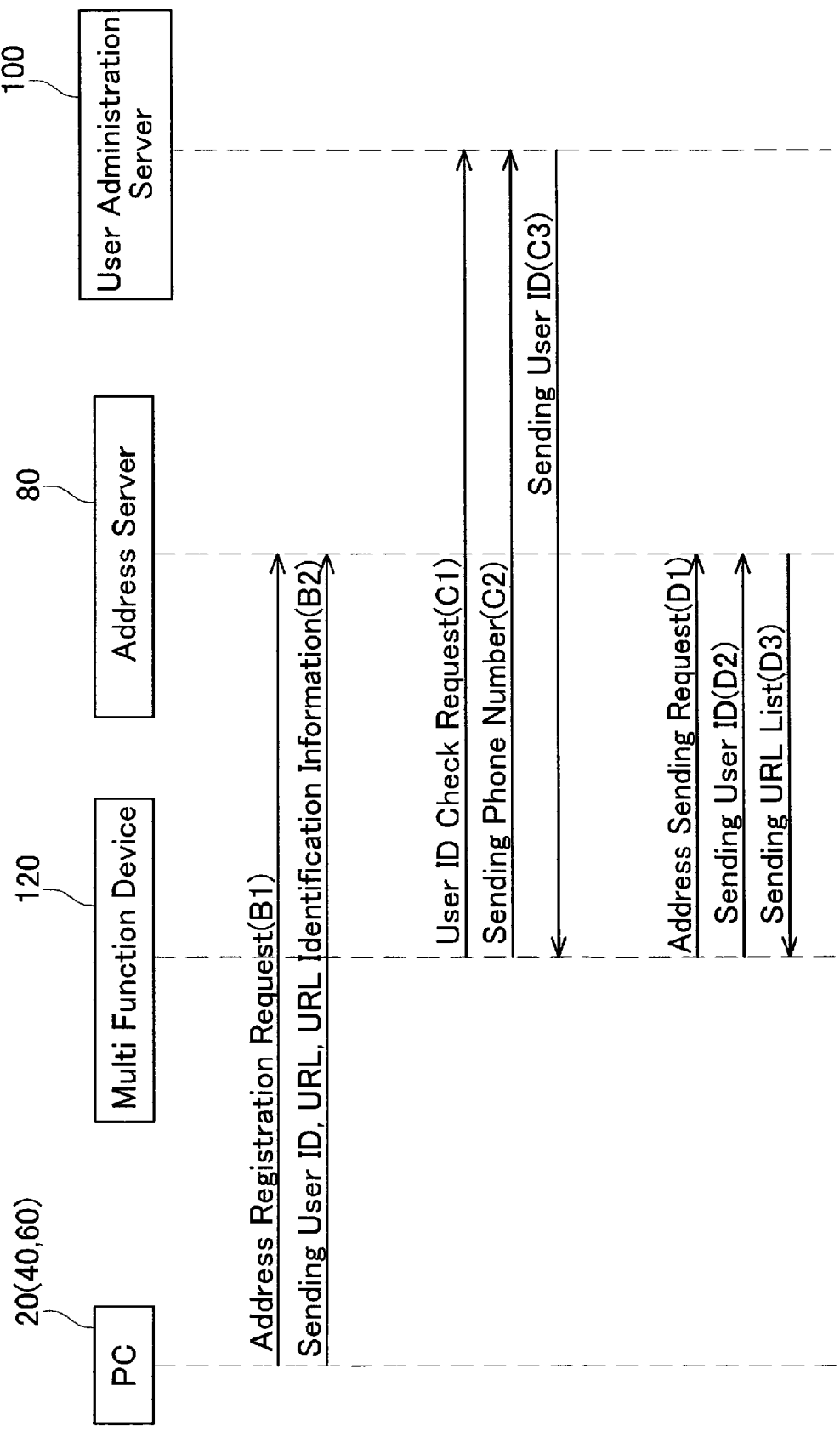
FIG. 20 shows a time chart of the processes executed by each device (second embodiment).

FIG. 20 shows a time chart of the processes executed by each device 20, (40, 60), 80, 100, and 120. The user can access any URL and input a user ID by operating the operating device 24 of the PC 20 (see FIG. 2). When the registration of a URL is requested by a user, the PC 20 does not perform the processes A1-A3 shown in FIG. 9 of the first embodiment, but the PC 20 sends a keyword registration request (B1) to the address server 80. The processes from B2 to D3 are identical to those of the first embodiment (the processes from B2 to D3 of FIG. 9). Because of this, a description of B2 to D3 is omitted. The address server 80 can combine a user ID with a URL, and store the same combination in the address DB 81 (see FIG. 3).

(Process of the PC)

Figure 21:
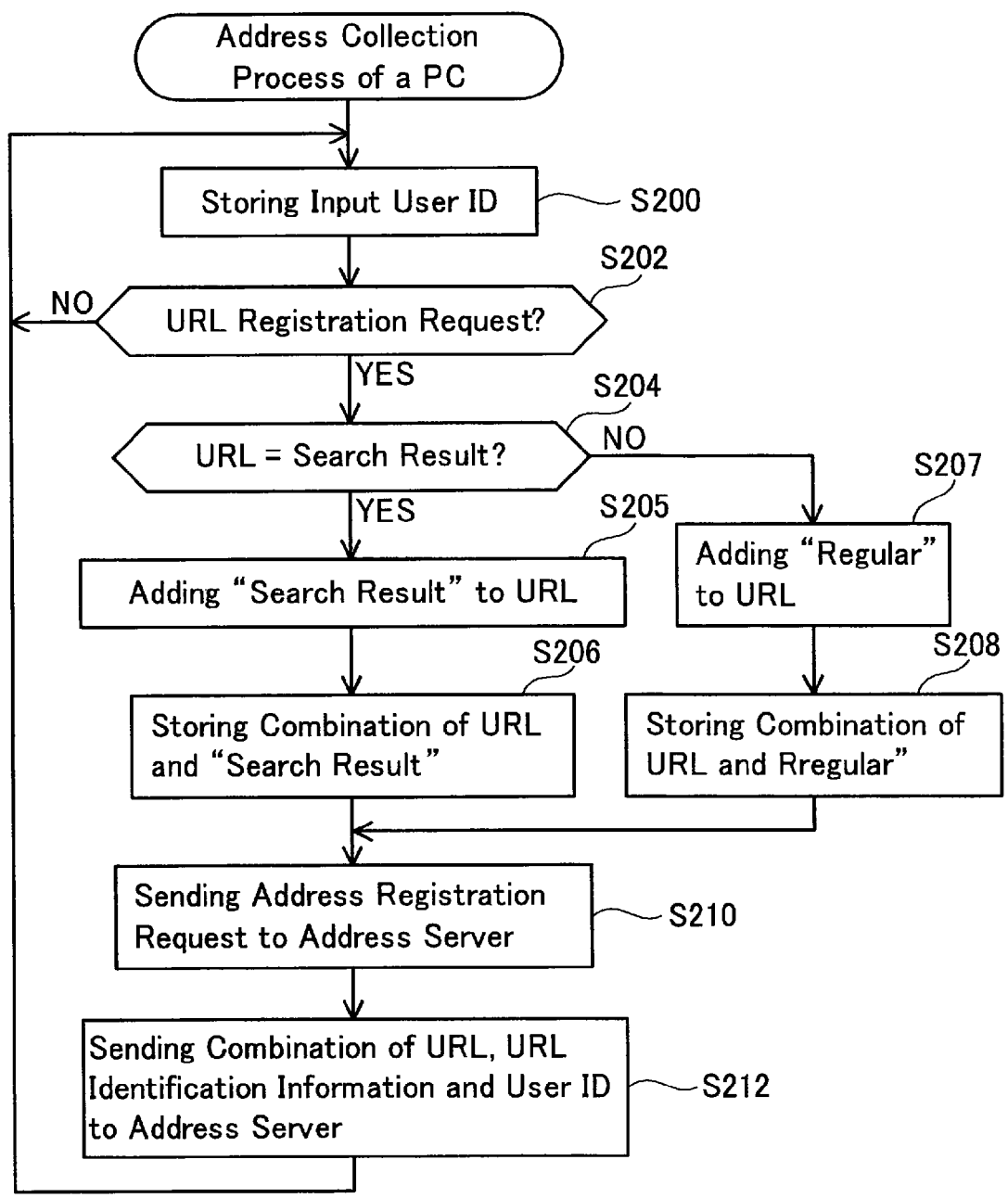
FIG. 21 shows a flowchart of the address collection process of the PC (second embodiment).

Next, the process executed by the PC 20 is described in detail. FIG. 21 shows a flowchart of the address collection process executed by the PC 20. As noted above, the user can input a user ID by operating the operating device 24. The controller 32 of the PC 20 stores the input user ID on the HD 26 (S200). The processes from S202 to S208 and S210 to S212 are identical to the processes from S10 to S16 and S26 to S28, respectively, of FIG. 10 of the first embodiment. Because of this, a description of S202 to S216 is omitted. In this way, a URL, URL identification information, and a user ID are sent as a set to the address server 80.

(Process of the User Administration Server)
(User ID Sending Process)

Figure 22:
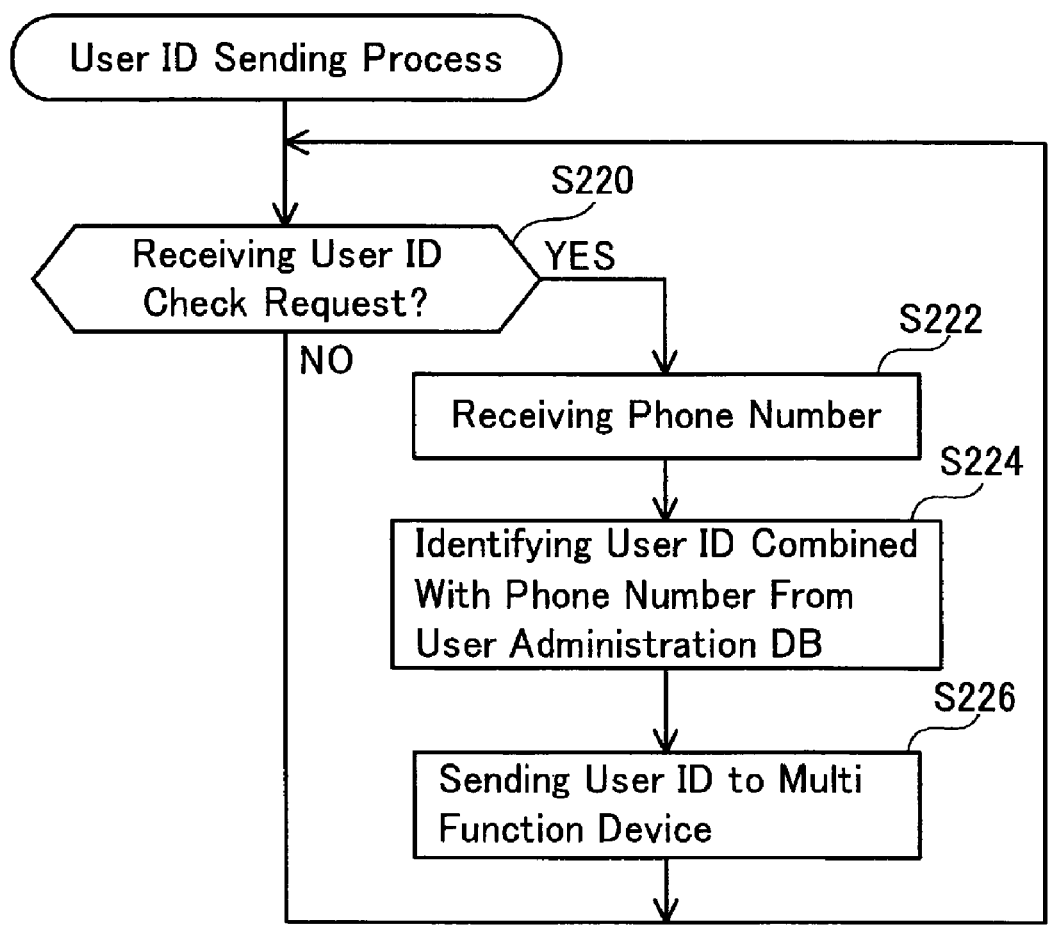
FIG. 22 shows a flowchart of a user ID sending process of the user administration server (second embodiment).

FIG. 22 shows a flowchart of the process executed by the user administration server 100. The controller 104 of the user administration server 104 (see FIG. 5) monitors whether a user ID check request has been received from the multi function device 120 (see S220 (see C1 of FIG. 20)). In a case where a user ID check request has been received (YES in S220), the controller 104 receives the phone number (S222 (see C2 of FIG. 21)). The processes from S224 to S226 are identical to the processes from S94 to S96 of FIG. 14 of the first embodiment. Because of this, a description of S224 to S226 is omitted. With the second embodiment, it is not necessary for a user to input a URL when accessing the same URL as a PC with the multi function device 120. Because of this, the burden on the user of inputting a URL can be eliminated.

The network system 10 of the second embodiment is useful when one PC is shared amongst a plurality of users. A plurality of users can be identified with a URL from one PC by inputting a user ID. For example, assume that a user X1 and a user X2 can share one PC. In addition, for example, assume that the user ID of users X1 and X2 are N1 and N2 respectively. In this case, the user administration DB 102 of the user administration server 100 can store a combination of the phone number of the user X1 and N1, and a combination of the phone number of the user X2 and N2. The address DB 81 of the address server 80 stores the combination of the address P1 and N1, and the combination of the address P2 and N2. For example, when there is an incoming call to the multi function device 120, and the phone number of a source is the phone number of the user X1, N1 is identified from the user administration DB 102, and the address P1 combined with N1 is acquired by the multi function device 120. For example, when there is an incoming call to the multi function device 120, and the phone number of a source is the phone number of the user X2, N2 is identified from the user administration DB 102, and the address P2 combined with N2 is acquired by the multi function device 120.

In this system, one of the plurality of users that use the PC can be identified based upon the phone number of the incoming call to the multi function device. The multi function device can acquire the address that was accessed by the identified user.

Specific examples of the present teaching were described in detail above, however these are simply illustrations, and do not limit the scope of the patent claims. The technology described in the scope of the patent claims includes various modifications and changes to the specific examples illustrated above. Variant embodiments of the aforementioned embodiments are provided below.

Variant Embodiment 1

Figure 23:
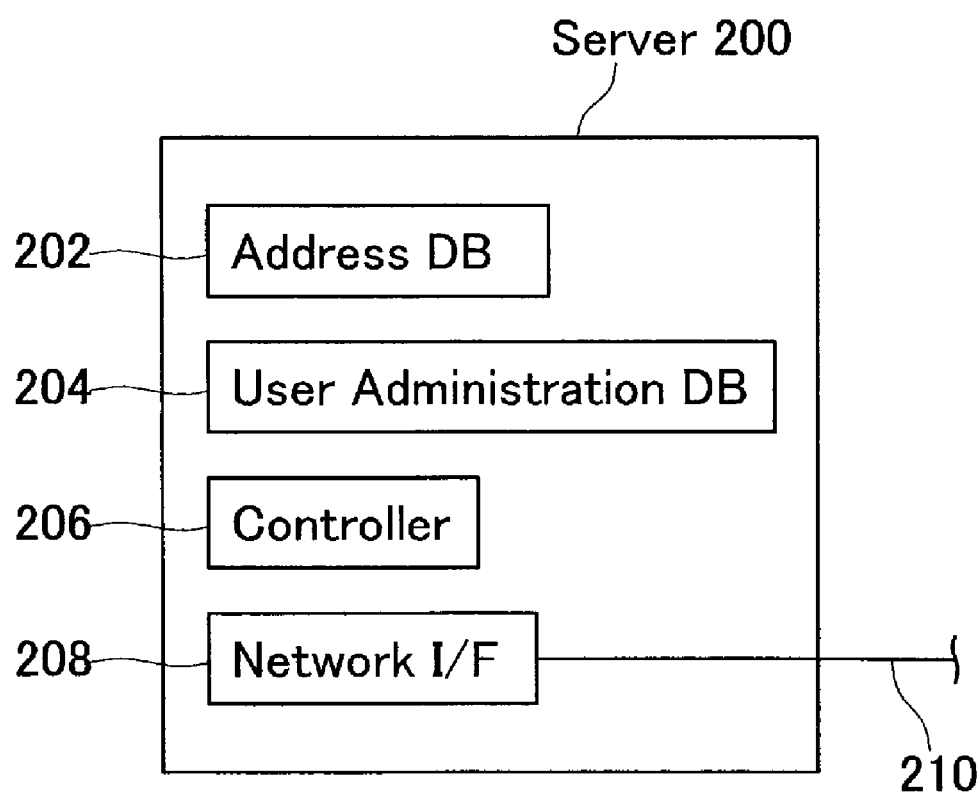
FIG. 23 shows the construction of a server of a variant embodiment 1.

With each of the aforementioned embodiments, the address server 80 is constructed separately from the user administration server 100. However, the address server 80 and the user administration server 100 may be one unified server. In this case, the server 200 can use the construction of FIG. 23. In other words, the server 200 includes a user administration database (user administration DB) 204, in addition to an address database (address DB) 202, and each device 206 and 208 that are identical in construction as in the address server 80 of the first embodiment. The server 200 is connected to the multi function device 120 and PCs 20, 40, 60 via the network cable 210. In the present variant embodiment, each process that is executed between the PCs 20, 40, 60, the multi function device 120, the address server 80, and the user administration server 100 of the first and second embodiments, is executed between the PCs 20, 40, 60; the multi function device 120; and the server 200.

Variant Embodiment 2

Figure 24:
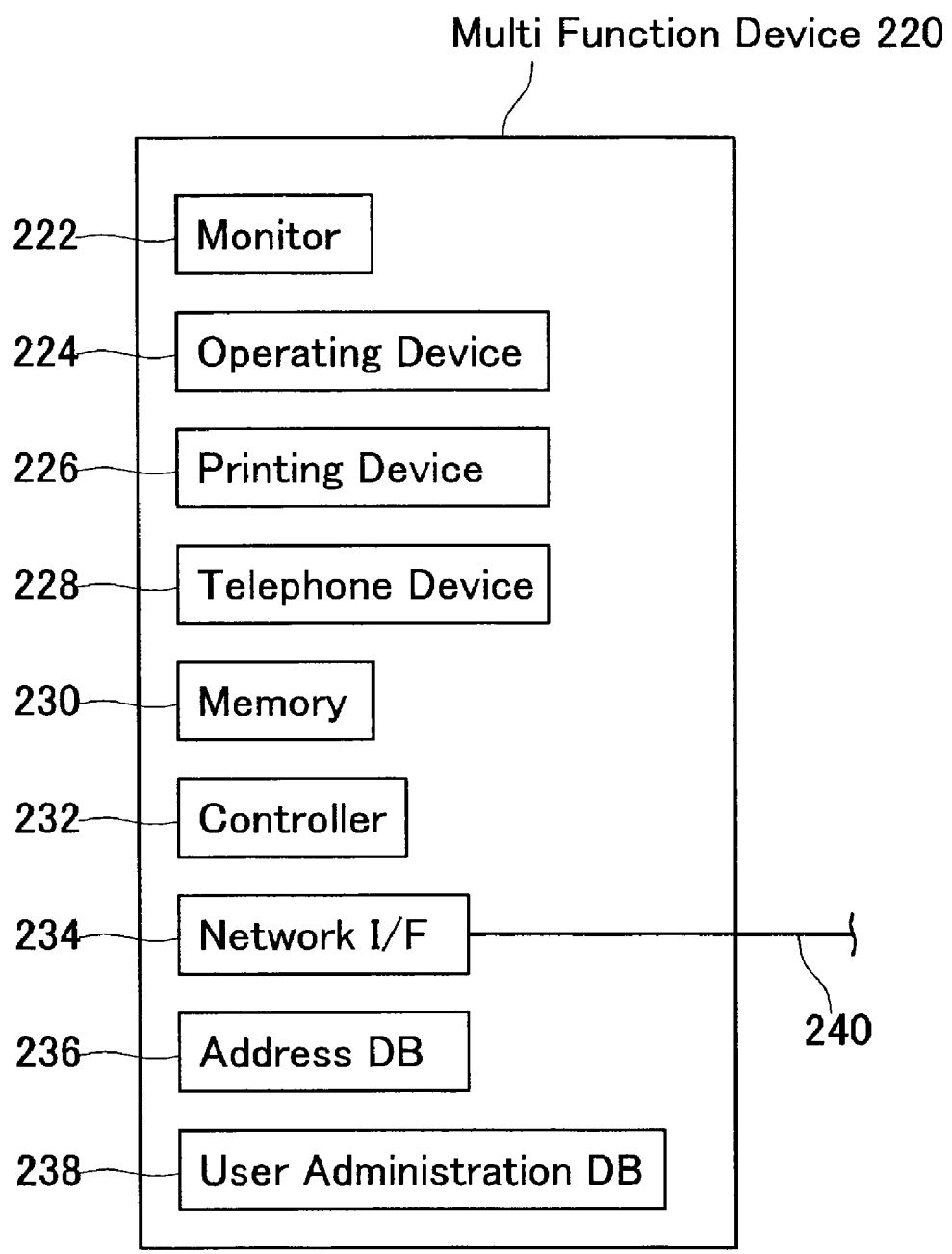
FIG. 24 shows the construction of a multi function device of a variant embodiment 2.

In each of the aforementioned embodiments, the address server 80 and the user administration server 100 are constructed separately from the PC 20, and are also constructed separately from the multi function device 120. However, the address database and the user administration database may be installed in the multi function device. In this case, the construction of FIG. 24 can be used. In other words, in addition to each device 222, 224, 226, 228, 230, 232 and 234 of the same construction as the multi function device 120 in the first embodiment, the multi function device 220 also includes the address database (address DB) 236 and the user administration database (user administration DB) 238. The server 200 is connected to the multi function device 120 and PCs 20, 40, 60 via the network cable 210. In the present variant embodiment, each process executed by the PC 20, 40, 60 and the multi function device 220 can be implemented by making slight changes in each flowchart of the aforementioned first embodiment and second embodiment (FIGS. 10-16, FIGS. 21, 22).

Variant Embodiment 3

In each of the aforementioned embodiments, the controller 32 of the PC 20 adds URL identification information to the URL and sends this to the address server 80. However, the URL identification information need not be added. In this case, there may be one address database in the address server 80. That address database may have the same construction as the regular address database of the first embodiment. In other words, the address database may combine and store the URL accessed by the PC, the user ID, and the registration date and time. In addition, in each of the aforementioned embodiments, the controller 32 of the PC 20 sends only the URL that was registered by the user to the address server 80. However, the controller 32 of the PC 20 may send to the address server 80, all the URLs that were accessed. This variant embodiment can be implemented by making a slight change to each flowchart of the aforementioned first or second embodiment (FIGS. 12, 13, 21).

Variant Embodiment 4

A device other than the PC 20 can be used to construct the system. For example, a multi function device may be used instead of the PC 20 to construct the system. In other words, the system may be constructed by a plurality of multi function devices, a plurality of PCs, an address server, and a user administration server. In addition, a device other than the multi function device 120 can be used to construct the system. For example, a PC may be used instead of the multi function device 120 to construct the system. In this case, the system is constructed by means of a plurality of PCs, an address server, and a user administration server.

Variant Embodiment 5

Each of the aforementioned embodiments use search engines on the Internet. However, each of the aforementioned embodiments need not necessarily use search engines on the Internet, and may use a search engine on a LAN. In other words, the technology disclosed in each of the embodiments can be implemented in a system constructed with a LAN only, without being connected to the Internet.

Variant Embodiment 6

In each of the aforementioned embodiments, the PC 20 stores the search result format list 30. However, the address server 80 or the multi function device 120 may store the search result format list 30. In this case, address identification information can be added to an address accessed with the PC 20 by means of a device that stores the search result format list. Each process executed by the PC and the multi function device of the present variant embodiment can be implemented by making slight changes in each flowchart of the aforementioned first and second embodiments (FIGS. 10, 12, 13, 16, 21).

The aforementioned network systems are particularly effective when the task of inputting an address into the multi function device 120 is troublesome. For example, in a case where the PC 20, 40, 60 includes a keyboard, the user X can use the keyboard to easily input an address into the PC 20, 40, 60. The user X can also use the keyboard to input a keyword into the PC 20, 40, 60. The user X can easily access an address that was acquired as a search result from a search engine. In contrast, in a case where the multi function device 120 does not comprise a keyboard (e.g., in a case where it is necessary to use numeric keys to input an address or keyword), it is difficult for the user Y to input an address or keyword into the multi function device 120. In addition, for example, even when the multi function device 120 includes a keyboard, the user Y sometimes has to grasp the telephone device with one hand. In this case, it is difficult for the user Y to input an address or keyword into the multi function device 120. Because the aforementioned system can eliminate the burden on the user Y of inputting an address into the multi function device 120, the system functions effectively in these situations.

In the aforementioned network systems, at least one address, from a plurality of addresses that have been searched with the PC, can be selected by a user with the multi function device. With the multi function device, an address need not be input, and only a network address may be selected.

In the aforementioned network systems, monitor 122 of the multi function device 120 displays the URLs of the search results and the URLs of the regular site in a distinguishable manner. According to this construction, a user can use the multi function device 120 to judge whether an acquired address is a search result address, or whether it is an address other than this.

In addition, the technological components described in the present specification or the drawings exhibit technological utility individually or in various combinations, and are not limited to the combinations disclosed in the claims at the time of application. In addition, the technology illustrated in the present specification or the drawings simultaneously achieve a plurality of objects, and achieving one object from amongst these has technological utility in and of itself.

What is claimed is:

1. A network system, comprising:
    a first communication device;
    a second communication device composed separately from the first communication device; and
    a server composed separate from the first communication device, wherein the first communication device comprises:
        a first access device capable of accessing a network address, and
        an address sending device that sends a combination of the network address accessed by the first access device and communication device identification information of the first communication device to the server;
    wherein the server comprises:
        an address database that stores the combination of the network address and the communication device identification information sent from the address sending device,
        an identification information database that stores a combination of the communication device identification information and telephone identification information of a source, and
        an identification information identifying device;
    wherein the second communication device comprises:
        a telephone device that receives the telephone identification information,
        an address acquisition device that acquires the network address from the address database when the telephone device receives an incoming call, and
        a second access device capable of accessing the network address acquired by the address acquisition device;
    wherein the identification information identifying device identifies, from the identification information database, the communication device identification information combined with the telephone identification information received by the telephone device; and
    wherein the address acquisition device acquires, from the address database, the network address combined with the communication device identification information identified by the identification information identifying device.

2. The network system as in claim 1, wherein:
    the server is separate from the second communication device;
    the second communication device further comprises a telephone identification information sending device that sends the telephone identification information received by the telephone device to the server;
    the identification information identifying device identifies, from the identification information database, the communication device identification information combined with the telephone identification information sent from the telephone identification information sending device;
    the server further comprises an address identifying device that identifies, from the address database, the network address combined with the communication device identification information identified by the identification information identifying device, and a server side address sending device that sends the network address identified by the address identifying device to the second communication device; and
    the address acquisition device acquires the network address by receiving the network address sent from the server side address sending device.

3. The network system as in claim 1, wherein:
    the address database cumulatively stores network addresses accessed by the first access device, the network addresses combined with the communication device identification information of the first communication device;
    the address acquisition device acquires the network addresses stored in the address database in the case where the telephone device receives the incoming call;
    the second communication device further comprises a displaying device that displays the network addresses acquired by the address acquisition device, and a selecting device that allows a user to select at least one network address displayed on the displaying device; and
    the second access device accesses the selected network address.

4. The network system as in claim 3, wherein:
    when the network addresses acquired by the address acquisition device includes first network addresses corresponding to a search result of a search engine and the other network addresses, the displaying device displays the first network addresses and the other network addresses in a distinguishable manner.

5. The network system as in claim 4, wherein:
    the first communication device further comprises an address identification information adding device that adds address identification information to the network address accessed by the first access device, the address identification information indicates whether the network address corresponds to the search result of the search engine; and the displaying device displays the first network addresses and the other network addresses in the distinguishable manner based on the address identification information added to each network address.

6. The network system as in claim 5, wherein:

the first communication device further comprises a search result format list that stores a plurality of patterns of a character string indicating search results of search engines;

when the network address accessed by the first access device includes any character string stored in the search result format list, the address identification information adding device adds the address identification information to the network address.

7. The network system as in claim 1, wherein:

the first communication device further comprises an operating device; and when the first access device accesses a network address and the operating device is operated by a user to perform a predetermined operation, the address database stores the network address.

8. The network system as in claim 1, wherein:

the second communication device further comprises a printing device capable of printing information existing on the network address accessed by the second access device.

9. A network system, comprising:

a first communication device;

a second communication device separate from the first communication device; and a server composed separately from the first communication device, wherein the first communication device comprises:

a first access device capable of accessing a network address, an input device that allows a user to input user identification information, and an address sending device that sends a combination of the network address accessed by the first access device and the user identification information input to the input device to the server;

wherein the server comprises:

an address database that stores the combination of the network address and the user identification information sent from the address sending device, an identification information database that stores a combination of the user identification information and telephone identification information of a source, and an identification information identifying device;

wherein the second communication device comprises:

a telephone device that receives the telephone identification information, an address acquisition device that acquires the network address from the address database when the telephone device receives an incoming call, and a second access device capable of accessing the network address acquired by the address acquisition device, wherein the identification information indentifying device indentifies, from the identification information database, the user identification information combined with the telephone identification information received by the telephone device, and wherein the address acquisition device acquires, from the address database, the network address combined with the user identification information identified by the identification information identifying device.

* * * * *